(12) United States Patent
Wu et al.

(10) Patent No.: US 10,187,445 B2
(45) Date of Patent: Jan. 22, 2019

(54) SYSTEM, METHOD AND BROWSER CLIENT FOR ENABLING BROWSER DATA SYNCHRONIZATION

(71) Applicant: BEIJING QIHOO TECHNOLOGY COMPANY LIMITED, Beijing (CN)

(72) Inventors: Hao Wu, Beijing (CN); Huan Ren, Beijing (CN)

(73) Assignee: Beijing Qihoo Technology Company Limited, Beijing (CN)

(*) Notice: Subject to any disclaimer, the term of this patent is extended or adjusted under 35 U.S.C. 154(b) by 616 days.

(21) Appl. No.: 14/652,844

(22) PCT Filed: Sep. 17, 2013

(86) PCT No.: PCT/CN2013/083624
§ 371 (c)(1),
(2) Date: Jun. 17, 2015

(87) PCT Pub. No.: WO2014/094468
PCT Pub. Date: Jun. 26, 2014

(65) Prior Publication Data
US 2015/0334182 A1 Nov. 19, 2015

(30) Foreign Application Priority Data

Dec. 17, 2012 (CN) .......................... 2012 1 0548620
Dec. 17, 2012 (CN) .......................... 2012 1 0548656
(Continued)

(51) Int. Cl.
*H04L 29/08* (2006.01)
*G06F 17/30* (2006.01)
*H04L 29/06* (2006.01)

(52) U.S. Cl.
CPC ........ *H04L 67/02* (2013.01); *G06F 17/30575* (2013.01); *H04L 67/1095* (2013.01);
(Continued)

(58) Field of Classification Search
CPC ......... H04L 67/02; H04L 67/14; H04L 67/42; H04L 67/26; H04L 67/1095; H04L 67/141; G06F 17/30575
See application file for complete search history.

(56) References Cited

U.S. PATENT DOCUMENTS 6,208,995 B1 * 3/2001 Himmel ............ G06F 17/30884
6,421,781 B1 7/2002 Fox et al.
(Continued)

OTHER PUBLICATIONS

Stack Overflow, "Is there some way to PUSH data from web server to browser?," Aug. 21, 2008, https://stackoverflow.com/questions/19995/is-there-some-way-to-push-data-from-web-server-to-browser.*

(Continued)

*Primary Examiner* — Scott B Christensen
*Assistant Examiner* — Lam T Do
(74) *Attorney, Agent, or Firm* — Baker & Hostetler LLP

(57) ABSTRACT

The invention provides a system, method and browser client for enabling browser data synchronization. By the invention, command information is sent to a target client via a push server in time in the case that the data content stored in a cloud storage server is updated, thereby enabling real-time data synchronization between the cloud storage server and the browser client simply and efficiently. The invention further discloses an apparatus and method for server distribution in browser real-time synchronization, a method for server distribution in browser real-time synchronization, a system for preventing a malicious connection, a system, method and information distribution database for enabling browser data synchronization, and a socket server and its service method for sending command information from a push server to a target client among a plurality of browser clients.

16 Claims, 11 Drawing Sheets

(30) Foreign Application Priority Data

| Dec. 17, 2012 | (CN) | 2012 1 0548938 |
| Dec. 17, 2012 | (CN) | 2012 1 0549375 |
| Dec. 17, 2012 | (CN) | 2012 1 0549446 |

(52) U.S. Cl.
CPC .............. *H04L 67/14* (2013.01); *H04L 67/26* (2013.01); *H04L 67/42* (2013.01); *H04L 67/141* (2013.01)

(56) References Cited

U.S. PATENT DOCUMENTS

| 6,654,786 | B1* | 11/2003 | Fox | H04L 29/06 709/203 |
| 7,877,783 | B1* | 1/2011 | Cline | H04L 41/00 726/2 |
| 8,200,962 | B1* | 6/2012 | Boodman | G06F 21/53 713/161 |
| 8,656,026 | B1* | 2/2014 | Prasad | H04L 67/22 709/217 |
| 2002/0116475 | A1* | 8/2002 | Berg | H04L 29/06 709/219 |
| 2003/0217262 | A1* | 11/2003 | Kawai | H04L 63/0428 713/153 |
| 2006/0109839 | A1* | 5/2006 | Hino | H04L 63/083 370/352 |
| 2013/0132523 | A1* | 5/2013 | Love | H04L 65/60 709/219 |

OTHER PUBLICATIONS

Linden, Peter van der, "Networking in Java;" Apr. 12, 2002, http://www.informit.com/articles/article.aspx?p=26316&seqNum=5.*

Un-Hyon, G., English abstract only of Chinese application No. CN1305161 A, Propelling tenique of common universal net browser, publication date Jul. 25, 2011, one page.

Yang, J., English abstract only of Chinese application No. CN1464414 A, Process for increasing computer network system capacity, publication date Dec. 31, 2003, one page.

International Search Report regarding PCT/CN2013/083624, dated Dec. 26, 2013, 3 pages.

Bedi, B.V. et al, English abstract only of Chinese application No. CN1620012 A, Method and system for updating/reloading the content of pages browsed over a network, publication date May 25, 2005, one page.

Vesa, H., English abstract only of Chinese application No. CN101199231 A, Fixed access point for a terminal device, publication date Jun. 11, 2008, one page.

Quanxi, Z., English abstract only of Chinese application No. CN101551821A, Method of real-time information broadcasting in web, publication date Oct. 7, 2009, one page.

Huaien, G., English abstract only of Chinese application No. CN102006322A, Method and system for remote meter reading on basis of internet, publication date Apr. 6, 2011, one page.

\* cited by examiner

SYSTEM, METHOD AND BROWSER CLIENT FOR ENABLING BROWSER DATA SYNCHRONIZATION

FIELD OF THE INVENTION

The invention relates to the information technology field of data synchronization, and in particular, to a system, method and browser client for enabling browser data synchronization.

BACKGROUND OF THE INVENTION

Nowadays, with the development of network technologies, as a bulky information resource, the internet has become a most convenient and quickest approach for people to obtain information. At present, a user generally uses a personal computer to access the Internet, and obtains required information by accessing a web page through a browser installed in the personal computer. With the development of mobile communication technologies, the user may also access the Internet via a mobile terminal supporting the function of a browser, for example, a mobile phone, a personal digital assistant (PDA for short).

However, in general, neither a browser on a personal computer nor a browser on a mobile terminal will provide a push service, the information interaction between a server and a client relies on the connection initiated by the client, and the server can not actively send information to the client, and thereby the real-time information synchronization between the server and the browser client can not be enabled.

In the prior art, a most commonly used way of enabling browser data synchronization between a browser client and a server is that the browser client sends a request to the server at a certain frequency, e.g., once a week or once a month, and obtains relevant information if there is an update of the information in the server. However, the applicants have found that there are the following technical drawbacks for such a way of data synchronization: the efficiency is relatively low, the occupied resources are many, and a truly real-time and synchronized update of content can not be accomplished.

In a particular implementation, the browser client performs data synchronization with the server by means of a socket server, and thus the browser client needs to remain connected to the socket server. However, with respect to a specific browser client, the procedure in which a corresponding socket server is distributed to it or addressed still needs to be further optimized.

In the case in which the connection between a browser client and the network side is maintained in order to enable real-time synchronization of data at the browser client, there is a situation in which some browser clients maliciously and ceaselessly initiate a connection request to the network side, and yet the network side continuously allocates network resources to users of these browser clients and continuously stores the allocation information in a corresponding store, which will occupy a lot of storage resources and result in substantial waste of storage resources. In the prior art, there lacks an effective mechanism to prevent the generation of an illegal connection.

In addition, in the prior art, a socket service is frequently used when establishing a connection between a server and a client. By socket, it refers to a communication mode between a client and server in a network. When between the server and the client a connection is to be established and data is to be communicated, it is needed to dock the server and the client for which a connection needs to be established (target client), and a socket may be regarded as a "docking number" of such docking. Only if the "docking number" of the server is identical to that of the target client, a connection can be conducted to communicate data. A socket service is just a docking service provided for a server and a client. However, a common socket service employs a synchronous scheduling mode when enabling data push to multiple clients, that is, after a socket server sends a message to a client, it waits for the reception and confirmation by the client, and then pushes the message to a next client. Moreover, a common socket service adopts the http protocol, and the http protocol will occupy many system resources, and result in rapid consumption of resources, thereby reducing the real time nature of data synchronization.

SUMMARY OF THE INVENTION

In view of the above problems, the invention is proposed to provide a system, method and browser client for enabling browser data synchronization, which overcome the above problems or at least in part solve the above problems.

According to an aspect of the invention, there is provided a system for enabling browser data synchronization, which comprises: a cloud storage server, a push server and a plurality of browser clients, wherein the cloud storage server is configured to issue condition information and command information to the push server when there is a data update; the push server is configured to determine a target client among the plurality of browser clients according to the condition information, and send the command information to the target client; and the target client is configured to enable data synchronization between it and the cloud storage server according to the command information.

According to another aspect of the invention, there is provided a method for enabling browser data synchronization applied in the above system for enabling browser data synchronization, which method comprises: the cloud storage server issuing condition information and command information to the push server when there is a data update; the push server determining a target client among the plurality of browser clients according to the condition information, and sending the command information to the target client; and the target client enabling data synchronization between it and the cloud storage server according to the command information.

According to yet another aspect of the invention, there is provided a browser client comprising: a connection module configured to establish a connection relationship with a socket server via a distributor, and receive command information from a corresponding socket server; and an application module configured to, according to the command information, perform a corresponding application operation thereof.

According to still another aspect of the invention, there is provided a computer program comprising a computer readable code which causes a server to perform the method for enabling browser data synchronization according to any of claims 9-15, when said computer readable code is running on the server.

According to still another aspect of the invention, there is provided a computer readable medium storing the computer program as claimed in claim 16 therein.

The beneficial effects of the invention lie in that:

(1) a separate push server is disposed, and in a case in which the data content stored in the cloud storage server is updated, command information is sent to the target client in time via the push server, thereby enabling real-time data synchronization between the cloud storage server and the browser client simply and efficiently;

(2) the cloud storage server, the target client and the initiation client have already existed in an existing browser system, and therefore adding a push server on this basis may effectively take advantage of the original system architecture, and reduce the cost for enabling a real-time synchronization system;

(3) by adding a socket server, a distributor and a distribution information database, a connection of the cloud storage server, the push server and the target client is implemented successfully; and (4) the command information pushed to the target client by the push server is a notification message, and after receiving the notification message pushed by the push server, the target client downloads the data content which is updated from the cloud storage server, and performs the synchronization of local data content according to the downloaded content, which may thus save system resources further.

The above description is merely an overview of the technical solutions of the invention. In the following particular embodiments of the invention will be illustrated in order that the technical means of the invention can be more clearly understood and thus may be embodied according to the content of the specification, and that the foregoing and other objects, features and advantages of the invention can be more apparent.

BRIEF DESCRIPTION OF THE DRAWINGS

Various other advantages and benefits will become apparent to those of ordinary skills in the art by reading the following detailed description of the preferred embodiments. The drawings are only for the purpose of showing the preferred embodiments, and are not considered to be limiting to the invention. And throughout the drawings, like reference signs are used to denote like components. In the drawings.

DETAILED DESCRIPTION OF THE INVENTION

In the following the invention will be further described in connection with the drawings and the particular embodiments.

Figure 1:
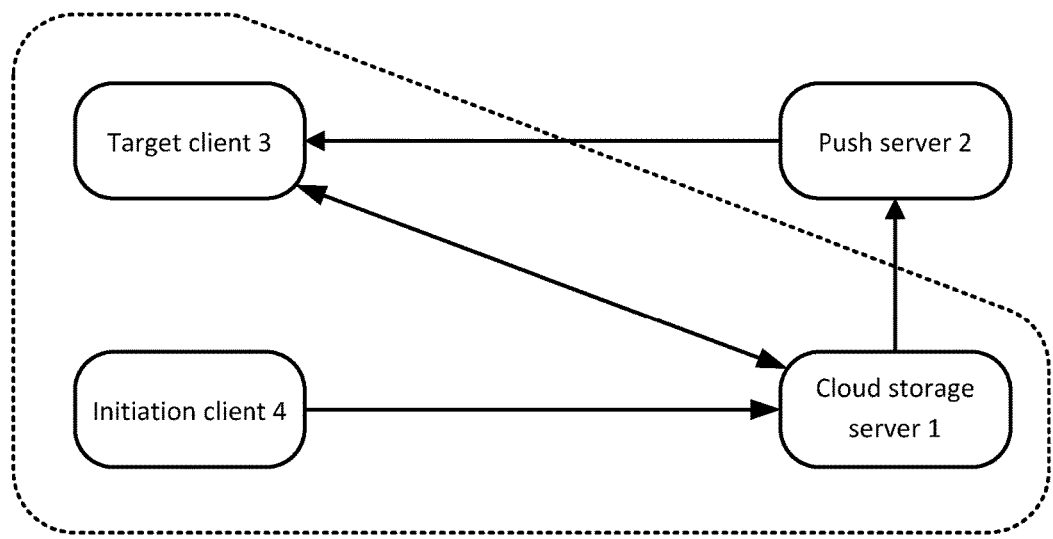
FIG. 1 is a structural schematic diagram of a system for enabling browser data synchronization according to an embodiment of the invention.

In an exemplary embodiment of the invention, there is provided a system for enabling browser data synchronization. As shown in FIG. 1, the system for enabling browser data synchronization comprises a cloud storage server 1, a push server 2 and a plurality of browser clients 3, 4, wherein the cloud storage server 1 is configured to issue condition information and command information to the push server when there is a data update; the push server 2 is configured to determine a target client among the plurality of browser clients according to the condition information, and send the command information to the target client 3; and the target client 3 is configured to enable data synchronization between the target client and the cloud storage server according to the command information.

In the embodiment as shown in FIG. 1, by disposing a separate push server 2, in a case in which the data content stored in the cloud storage server is updated, command information is sent to the target client in time via the push server, thereby enabling real-time synchronization of the data in the server with the client simply and efficiently.

As shown in FIG. 1, in the plurality of browser clients are contained an initiation client 4 and a target client 3. Therein, the initiation client 4 is configured to update data stored in the cloud storage server 1. The initiation client 4 and the target client 3 may pertain to one and the same user, or also may pertain to different users. A main application scenario for the case in which the initiation client 4 and the target client 3 pertain to one and the same user lies in that the same user uses different devices (e.g., a mobile phone and a PC) to log in a browser, and if one of them (e.g., the PC) changes the favorites, then this update needs to be synchronized to the other device (the mobile phone) of the same user. An application scenario for the case in which the initiation client 4 and the target client 3 do not pertain to one and the same user is for example that information is communicated between different browser clients.

Figure 4:
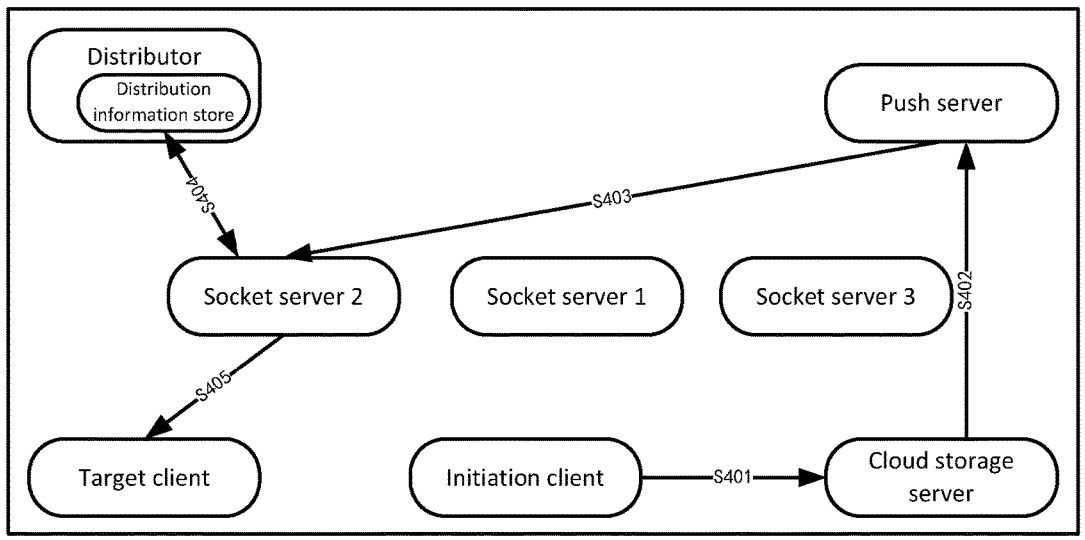
FIG. 4 is a schematic diagram of a procedure in which information is pushed to a target client in a first kind of scenario in the system for enabling browser data synchronization as shown in FIG. 2.

Of course, in the invention, the cloud storage server itself may also initiate an update of the data content, and in such a case, the initiation browser client 4 in FIG. 4 may not be present. A scenario for such a case is for example that the system pushes a news message or weather forecast to all the browser clients; or the system initiates an update instruction to all the browser clients of a certain version.

Since the cloud storage server 1, the target client 3 and the initiation client 4 within the dashed box in FIG. 1 have already existed in an existing browser system, adding a push server on this basis may effectively take advantage of the original system architecture, and reduce the cost for implementing the invention.

Figure 2:
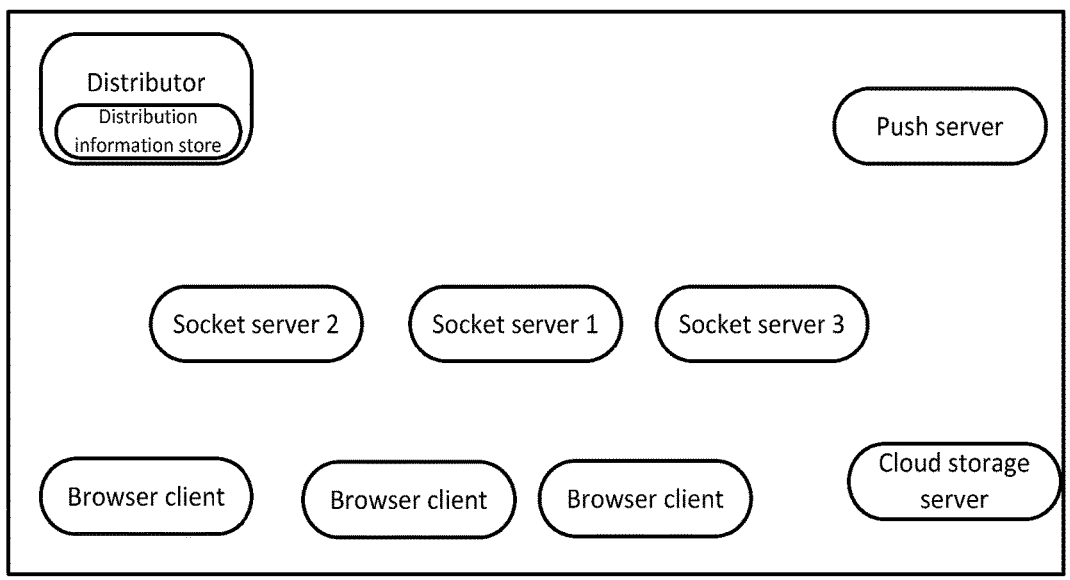
FIG. 2 is a structural schematic diagram of a system for enabling browser data synchronization according to another embodiment of the invention.

To realize a connection of the cloud storage server 1, the push server 2 and the target client 3, as shown in FIG. 2, the system for enabling data synchronization between the browser client and the cloud storage server may further comprise a plurality of socket servers, and a distributor.

According to the invention, to increase the efficiency of enabling data synchronization between the browser client and the cloud storage server, there is proposed a socket server dedicated to providing a socket service between the push server and the cloud storage server. The socket server is configured to establish socket connections with a plurality of browser clients, and upon receiving the condition information and the command information, determine a target client from the plurality of browser clients according to the condition information, and send the command information to the target client.

The socket server is a virtual server, and it may be realized by configuring an existing server which provides a socket service, or also may be realized by software or a software module with independent functions.

Figure 3:
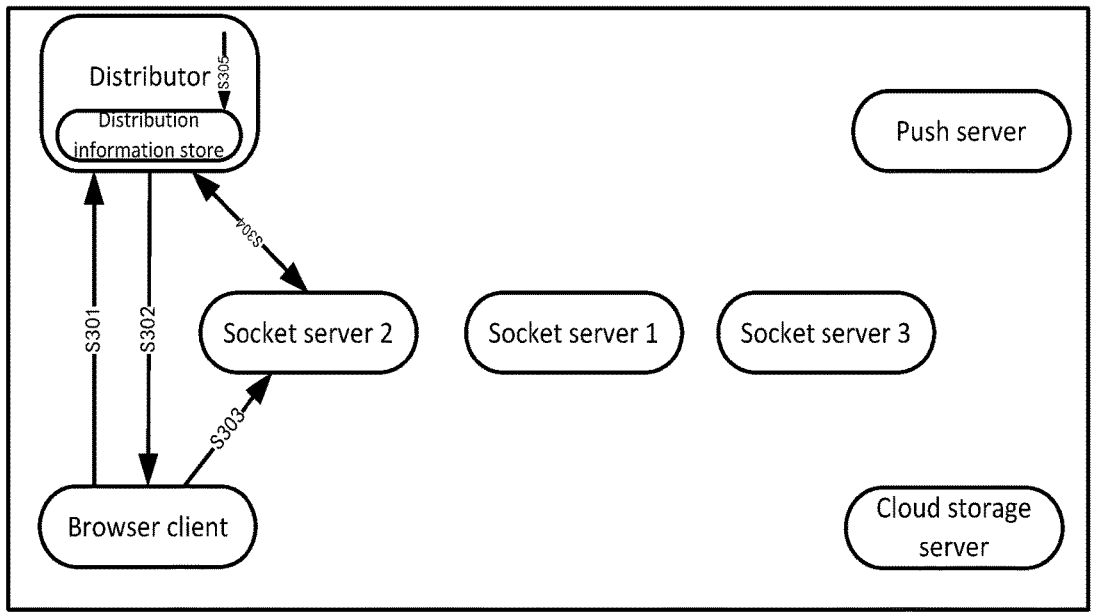
FIG. 3 is a schematic diagram of a procedure in which a browser client establishes a connection with a socket server in the system for enabling browser data synchronization as shown in FIG. 2.

The distributor is configured to, after receiving a connection request from a client, allocate a corresponding socket server and a connection identifier to it, and store the user identification information and the connection identifier into a distribution information database. A detailed procedure of establishing a connection is as shown in FIG. 3, and comprises the following steps.

In step S301, a browser client submits a connection request to the distributor, in this connection request, there is at least comprised user identification information, and for a login user, his user identification information may comprise a user name, whereas for a non-login user, his user identification information may comprise the user's machine hardware identification.

For a login user, the user identification information may be a string, wherein in addition to the user name of the login user, the string further comprises information such as login time and verification characters, etc. The user name is the user's unique identification number, i.e., a figure, for representing a user. The verification characters are generated according to the user name, that is, it may be judged by the verification characters whether the user identification information has been changed.

For a non-login user, the user identification information may comprise a machine hardware identification of the non-login user, wherein the machine hardware identification is the unique identification of a machine, and generated with a Hash function by the client through the configurations of the user's machine and system, etc.

In addition, for subsequently screening out a target client, the connection request may further comprise user feature information, for example, IP address information, browser version information, or user classification information, etc., wherein the user feature information such as the browser version number, the user classification information or the IP address information, etc. may be used for subsequently screening out a client.

In step S302, the distributor performs calculation using a preset algorithm based on the user identification information to obtain a value, and allocates a socket server to the browser client submitting the connection request according to the value; the value is globally unique, i.e., a connection identifier; and the distributor sends connection information such as an IP address, a port, etc. as well as the connection identifier to the browser client submitting the connection request.

In this step, the above mentioned value is calculated using a preset algorithm according to the user name of a login user. For a non-login user, the value is calculated directly employing the machine hardware identification of the non-login user, and the algorithm may be a cyclic redundancy check (CRC) 32 algorithm.

In step S303, according to the received IP address and port number of a socket server, the browser client establishes a connection with the corresponding socket server, and the connection may be a transmission control protocol TCP connection. When the browser client establishes a connection with a socket server, the socket server obtains a resource identifier identifying the connection relationship between the socket server and the browser client. The browser client utilizes the established connection to communicate the connection identifier received by it to the socket server.

In step S304, after receiving the connection identifier, the socket server verifies the connection identifier to the distributor, and if the verification is successful, keeps the connection established between it and the browser client, and if the verification is unsuccessful, disconnects the established connection.

In step S305, the distributor stores the user identification information (the user name of a login user or the machine hardware identification of a non-login user), the user feature information (if any) and the connection identifier in the distribution information database, and the socket server also stores the obtained resource identifier in the distribution information database.

It needs to be noted that to prevent allocation confusion caused by the change of the server, the browser client needs to perform step S301 to step S304 again for connection after a period of time.

In addition, for each socket server, a corresponding individual data sheet exists in the distribution information database to reduce the scale of the data sheet and expedite the query speed of the socket server in a subsequent information push stage.

By adding a distributor and a socket server and disposing a distribution information database in the distributor, it is enabled to store the user identification information, the resource identifier and the user feature information, etc. in the distribution information database in the connection establishing stage, thereby achieving push of data content to a preset target client by the push server.

In the information push stage, the push server is configured to send the condition information and the command information to a socket server; and the socket server is configured to forward the information pushed by the push server to a corresponding target client. The detailed information push procedure will be described in detail in three scenarios in the following.

(1) when the real-time synchronization is initiated by the initiation client, and the initiation client and the reception client belong to one and the same user, the condition information comprises the user identification information. For example, as shown in FIG. 4, the information push procedure comprises:

step S401: the initiation client initiating update of the data stored in the cloud storage server;

wherein the data stored in the cloud storage server comprises one of the following: favorites information, history record information, browser configuration information, note information, login housekeeper information, message reminder information, key information, and other possible information etc.;

step S402: the cloud storage server sending the condition information and the command information to the push server, wherein the condition information comprises the user identification information, for example, the user name of a login user or the machine hardware identification of a non-login user, and the condition information further comprises a resource identifier identifying the connection between the initiation client and its corresponding socket server;

step S403: the push server calculating a value by the same algorithm as in the distributor according to the user identification information, the value being a connection identifier, thereby obtaining a socket server allocated to the target client, and sending the condition information and the command information to the socket server allocated to the target client;

step S404: the socket server querying the distribution information database in the distributor according to the user identification information in the condition information, and determining the resource identifier corresponding to the target client, wherein the resource identifier identifying the connection between the initiation client and its corresponding socket server is excluded; and step S405: the socket server sending, in the connection(s) with the target client(s), the command information to the client according to the resource identifier.

Figure 5:
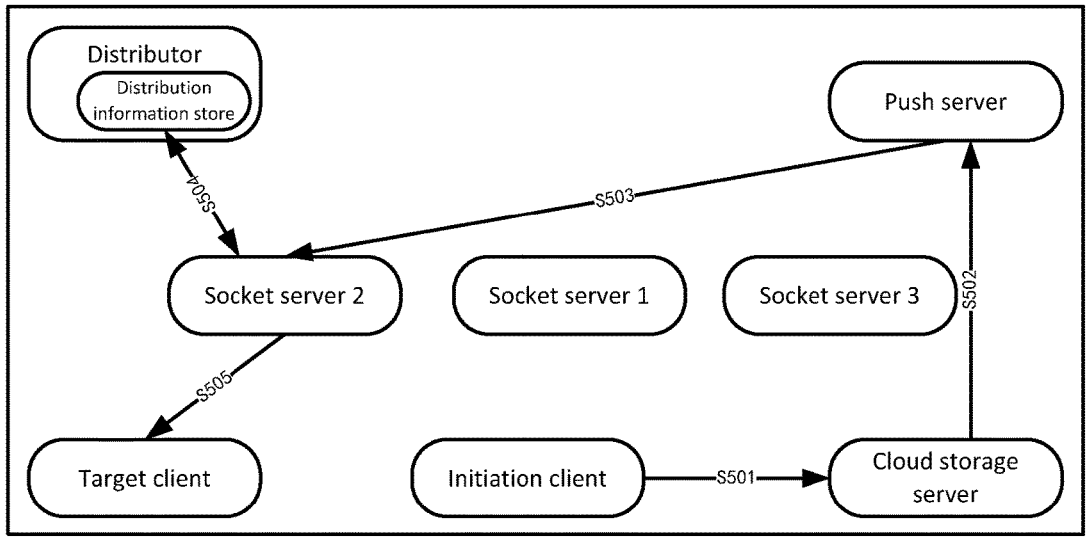
FIG. 5 is a schematic diagram of a procedure in which information is pushed to a target client in a second kind of scenario in the system for enabling browser data synchronization as shown in FIG. 2.

(2) when the real-time synchronization is initiated by the initiation client, and the initiation client and the reception client belong to different login users, namely, the condition information comprises the user identification information, as shown in FIG. 5, the information push procedure comprises:

step S501: the initiation client initiating update of the data stored in the cloud storage server;

wherein the data stored in the cloud storage server comprises one of the following: favorites information, history record information, browser configuration information, note information, login housekeeper information, message reminder information, key information, news information and/or user generated information, etc.;

step S502: the cloud storage server sending the condition information and the command information to the push server, wherein the condition information comprises the user identification information, for example, the user name of a login user or the machine hardware identification of a non-login user;

step S503: the push server calculating a value by the same algorithm as in the distributor according to the user identification information, the value being a connection identifier, thereby obtaining a socket server allocated to the target client, and sending the condition information and the command information to the socket server allocated to the target client;

step S504: the socket server querying the distribution information database in the distributor according to the user identification information in the condition information, and determining the resource identifier of the target client; and step S505: the corresponding socket server sending, in the connection(s) with the target client(s), the notification message to the client according to the resource identifier, and at this point, the information push procedure ends.

(3) when the real-time synchronization is actively initiated by the cloud storage server, and the condition information comprises feature screening information for a target client and does not comprise the user identification information, wherein the feature screening information may also be null, in such a case, in the connection establishing stage, the connection request submitted by a browser client to the distributor further contains feature screening information, which corresponds to the user feature information stored in the distribution information database as before.

Figure 6:
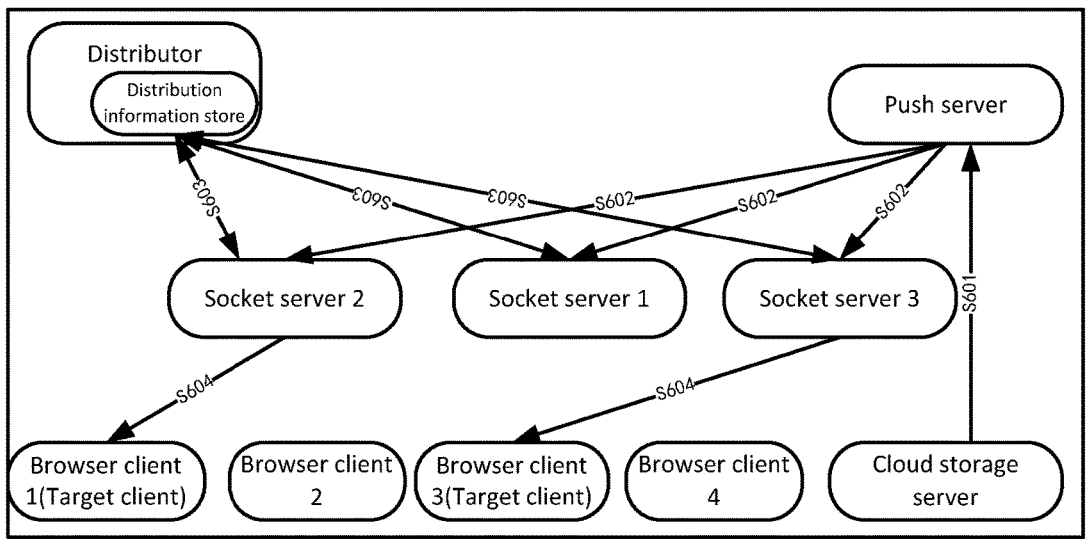
FIG. 6 is a schematic diagram of a procedure in which information is pushed to a target client in a third kind of scenario in the system for enabling browser data synchronization as shown in FIG. 2.

As shown in FIG. 6, the information push procedure comprises:

step S601: the cloud storage server issuing the condition information and the command information to the push server, wherein the condition information contains feature screening information (e.g., the version number of a browser) for a target client, and the command information is for example an instruction that notifies a user to perform an update;

step S602: the push server pushing the condition information and the command information to all the socket servers;

step S603: the individual socket servers submitting a query request to the distribution information database of the distributor, respectively, wherein the query request contains feature screening information; and the distribution information database querying user feature information of individual browser clients in the distribution information database according to the feature screening condition, determining the resource identifier of a target client which meets the feature screening condition, and returning the resource identifier to the individual socket servers which initiate the query; and step S604: the individual socket servers sending the command information to a corresponding client according to the received resource identifier, and at this point, the information push procedure ends.

In step S603, the query mechanism employed by the socket servers to determine the target client by querying the distribution information database mainly comprises the following two cases.

In a first case, the condition information comprises the user name of a login user or the machine hardware identification of a non-login user of the target client, and in this case, the push procedure is as follows.

The cloud storage server triggers real-time synchronization of the relevant information of the target client, and in particular, the cloud storage server sends to the push server the user identification information or machine hardware identification of the target client, the command information and other possible parameter information.

In the push server, the globally unique connection identifier is calculated by the same algorithm as in the distributor according to the user identification information or the machine hardware identification, in turn a socket server in which it is allocated is obtained, and then the push server sends the user identification information or the machine hardware identification and the command information to the calculated socket server.

The socket server queries the distribution information database according to the user identification information or the machine hardware identification, and determines the target client.

The corresponding socket server sends, in the connection(s) with the browser client(s) corresponding to the user identification information or the machine hardware identification, the command information to the client.

The client receives the command information, and according to the notification message content therein, downloads from the corresponding cloud storage server the updated content, for example, the configuration, favorites, etc. (there lacks this step if the content message is sent directly).

In a second case, the condition message does not comprise the user identification information or the machine hardware identification of the target client, and in this case, the push procedure is as follows.

The cloud storage server sends to the push server the condition information (e.g., a certain version number) and the command information (comprising a notification message or a content message, wherein the notification message is for example an instruction to notify a user to perform an update);

The push server pushes the condition information and the command information to all the socket servers;

The socket servers query the distribution information database according to the condition information, determine target clients, and then send the command information to corresponding target clients;

The command information is received in the corresponding target clients, and a corresponding action is triggered, for example, a popup window prompt, a download update, etc. (there lacks this step if the content message is sent directly).

In the above steps, it may also be performed first that the push server queries the distribution information database, and then it sends the information to corresponding socket servers according to the query result. To increase the query efficiency, the distribution information database preferably adopts the form of a database cluster, each socket server corresponds to a table in the distribution information database, in the table there is comprised the information on all the connections in the socket server, and the table is an information list taking the connection identifier as a key, and comprises at least information such as the connection identifier, the user identification information, the user feature information, and the resource identifier, etc.

The distribution information database may be implemented using any suitable database. In a preferred embodiment of the invention, the distribution information database may be implemented by selecting a document type database, preferably by selecting a database without limitation to the number of data columns, such that data items are flexible, which is beneficial for the compatibility with the deficiency and expansion of data items. An embodiment of the invention uses a MongoDB cluster to implement the database, and it may also be implemented using a CouchDB cluster or other similar database cluster.

If the distribution information database takes the form of a cluster, then under the above two query mechanisms, according to the number of the socket servers, the same number of portions may be maintained in the database cluster. In the above embodiment, for example, as shown in FIG. 4, in a case in which there are 3 socket servers in the system, the database cluster is also composed of three portions, and each portion maintains a table, which corresponds to information on a connection in each socket server. In particular, such a list is an information list taking a connection identifier as a key, comprising therein information such as connection identifiers, user feature information, resource identifiers, etc., and an example of the information list is for example as shown in the following table 1:

TABLE 1

| Connection identifier | Machine hardware identification | User name | IP | Version | Resource identifier | ... |
|---|---|---|---|---|---|---|
| S1 |  | A |  | 5.0.1.1 | 1 |  |
| S2 |  | A |  | 5.0.1.1 | 2 |  |
| S3 | B |  |  | 6.0.1.1 | 3 |  |
| S4 | C |  |  | 6.0.1.1 | 4 |  |

Therein, it may be possible to query out a corresponding connection identifier and resource identifier according to the machine hardware identification condition, the user name condition, the IP condition, the version condition and other condition, and then address a target client. It can be seen according to FIG. 4, one and the same user name may correspond to different connection identifiers, for example, in a situation in which one and the same user logs in using different devices (PC and mobile phone); however, due to the randomness and uniqueness of a machine hardware identification, in general, one machine hardware identification only corresponds to one connection identifier.

Under the above two query mechanisms, each socket server may independently query the table of that portion in the distribution information database corresponding to its connection, and then once one is queried out, the sending of the command information may be triggered. Thereby, on one hand, due to the cluster form of the distribution information database, it may be enabled that multiple parts synchronously query a specific portion of the distribution information database, thereby reducing the query volume of each part and increasing the query speed. On the other hand, since the query is performed by a socket server itself, it can trigger the sending of the command information immediately after each result is queried out, thereby greatly reducing the time delay and expediting the processing speed as compared to that a unified query is performed in the distribution information database, the result is passed to a socket server after the query is finished, and then the socket server performs the sending.

In order to further save system resources, the command information pushed by the push server 2 to a browser client 3 is a notification message. In such a case, the browser client is further configured to, after receiving the notification message pushed by the push server, establish a connection with the cloud storage server, download updated data content from the cloud storage server, and perform synchronization of local data content according to the downloaded data content. By communicating the notification message, the communicated data amount may be decreased, and the occupancy of system resources may be reduced.

Of course, the command information pushed by the push server to a target client may also be a content message, namely, the content message contain updated data content. In such a case, after receiving the content message pushed by the push server, the target client extracts the updated data content from the content message, and performs synchronization of local data content according to the extracted data content. By communicating the content message, the content message may be directly pushed to the client, information is passed quickly, and the step is simple.

In order to enable support of multiple languages and conveniently invoke a text, an HTTP interface is employed between the push server and the cloud storage server.

Figure 7:
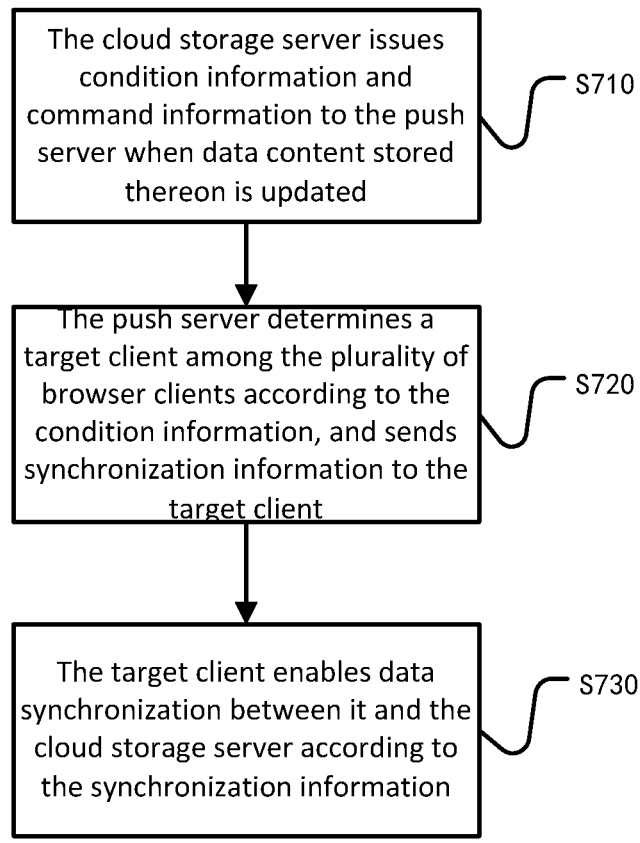
FIG. 7 is a flow chart of a method for enabling browser data synchronization according to an embodiment of the invention.

Based on the system for enabling browser data synchronization as shown in FIG. 1 and FIG. 2, the invention further provides a method for enabling browser data synchronization. As shown in FIG. 7, the method for enabling browser data synchronization comprises:

step S710: the cloud storage server issuing condition information and command information to the push server when there is a data update;

step S720: the push server determining a target client among the plurality of browser clients according to the condition information, and sending the command information to the target client; and step S730: the target client enabling data synchronization between it and the cloud storage server according to the command information.

Further, before step S710, there is further comprised establishing a socket connection between a browser client and a socket server, the procedure of establishing the connection is as shown in FIG. 3, and will not be repeated here.

Further, in step S710 of the cloud storage server issuing condition information and command information to the push server when there is a data update, if the condition information contains the user name of a login user or the machine hardware identification of a non-login user of a target client, then there are comprised the following two cases.

Case 1: the initiation client and the reception client pertain to one and the same user, the user uses different devices (e.g., a mobile phone and a PC) to log in a browser, and if one of them (e.g., the PC) changes the favorites, then this update needs to be synchronized to the other device (the mobile phone) of the same user;

in this case, the initiation client first initiates the modification of information on configurations, functions or favorites or other information stored in the cloud storage server. Then, the cloud storage server sends the condition information and the command information to the push server, the command information comprises a content message and a notification message, and the push server sends the command information to a target client according to the condition information via a socket server, wherein the target client rules out the initiation client. The information push procedure in such a case is as shown in FIG. 4, and will also not be repeated here.

Case 2: the initiation client and the reception client do not pertain to one and the same user, thereby enabling information interaction between different users via the clients.

In particular, a client of one user sends condition information and a content message to the cloud storage server, the cloud storage server sends the condition information and a relevant notification message to a pusher, the pusher sends the notification message to a target client according to the condition information, and in turn the target client may access the cloud storage server to obtain content. The information push procedure in such a case is as shown in FIG. 5, and will also not be repeated here.

In addition, if the condition information does not contain the user identification information of a target client, but may comprise feature screening information, then there is further comprised the following case.

Case 3: there is a data update in the cloud storage server itself, it is needed for a browser client to perform data synchronization with the cloud storage server, and the cloud storage server actively issues condition information and command information to the push server, for example:

1. the cloud storage server initiates an update instruction to all the browser clients of a certain version, to upgrade all the browser clients of the version to a new version, wherein the command information is a notification message of upgrading to a new version, and the condition is a browser client of a certain version, namely, the feature screening information therein is the version number of a browser client. Then, that the push server sends the command information to a target client among a plurality of browser clients according to the condition information comprises: the push server sending the notification message of upgrading to a new version to all the browser clients of a certain version.

2. the cloud storage server pushes a news message to all the browser clients, wherein the condition is all the browser clients, namely, the feature screening information is null, and the command information is a content message containing the news message; then, that the push server sends the command information to a target client among a plurality of browser clients according to the condition information comprises: the push server sending the content message containing the news message to all the browser clients. It should be understood that what is sent may also be a notification message.

3. the cloud storage server pushes a weather forecast to browser clients in different regions, wherein the condition is browser clients in a certain region, namely, the feature screening information is the IP segment corresponding to the certain region, and the command information is a content message containing the weather forecast; then, that the push server sends the command information to a target client among a plurality of browser clients according to the condition information comprises: the push server sending the content message containing the weather forecast to browser clients in a certain region. It should be understood that what is sent may also be a notification message.

The information push procedure in such a case is as shown in FIG. 6, and will also not be repeated here.

Figure 8:
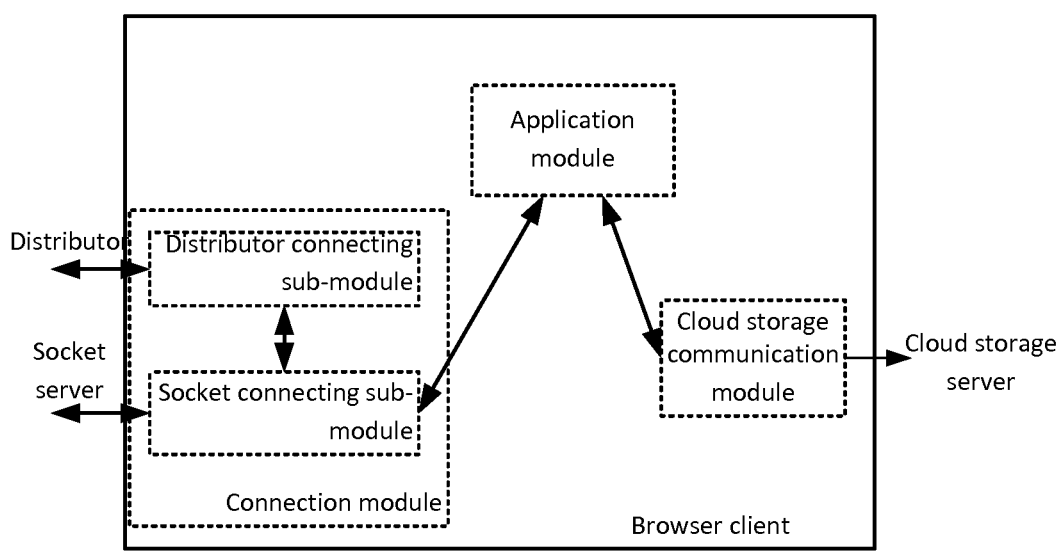
FIG. 8 is a structural schematic diagram of a browser client for enabling browser data synchronization according to an embodiment of the invention.

Based on the system for enabling browser data synchronization as shown in FIG. 1 and FIG. 2, the invention further provides a browser client for enabling browser data synchronization. As shown in FIG. 8, the browser client comprises: a connection module configured to establish a connection relationship with a socket server via a distributor, and receive command information from a corresponding socket server; and an application module configured to, according to the command information, perform a corresponding application operation thereof, wherein the command information is a notification message or a content message.

As shown in FIG. 8, the connection module further comprises: a distributor connecting sub-module configured to submit a connection request to the distributor, the connection request comprising at least user identification information, and receive connection information and a connection identifier of an allocated socket server returned by the distributor; and a socket connecting sub-module configured to establish a socket connection with a corresponding socket server according to the received connection information and the connection identifier of the socket server, and receive the command information from the corresponding socket server via the socket connection, wherein the user identification information is the user name of a login user or the machine hardware identification of a non-login user.

As shown in FIG. 8, the browser client may further comprise: a cloud storage communication module configured to communicate with a cloud storage server in response to an application operation of the application module.

Figure 16:
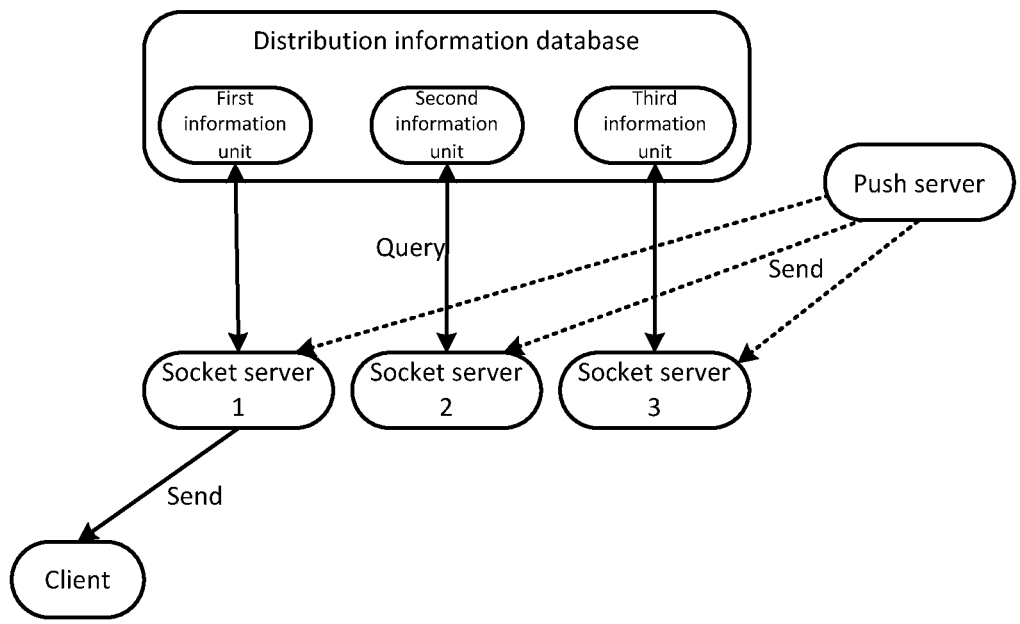
FIG. 16 is a structural schematic diagram of a system for enabling browser data synchronization employing a distribution information database in the form of a cluster according to an embodiment of the invention.

According to yet another embodiment of the invention, there is provided a distribution information database, and FIG. 16 is a structural schematic diagram of a system for enabling browser data synchronization using the distribution information database. Referring to FIG. 16, the distribution information database is in the form of a cluster database, for example, employing a MongoDB cluster or a CouchDB cluster. The distribution information database comprises N information units, wherein each information unit corresponds to a socket server, and in each information unit is stored information related to a connection corresponding to the socket server. The value of N is the number of socket servers connected to the distribution information database.

Each information unit in the distribution information database is a table, each table is an information list taking a connection identifier as a key, and the list comprises at least user identification information, machine hardware identification, and version number.

In addition, the distribution information database is preferably a document type database.

From the above, by disposing a separate push server, such a system, method and browser client for enabling browser data synchronization provided by the invention can send command information to a target client among a plurality of browser clients in time via the push server in a case in which the browser related content stored in a cloud storage server is updated, and resolves the problem of being unable to simply and effectively synchronize in real time data between the browser client and the cloud storage server, thereby enabling data synchronization between the browser client and the cloud storage server simply and efficiently. Thus, it may be such that on the basis of an original architecture, the browser client may synchronize information in real time with the cloud storage server efficiently, actively and with resources being saved. The system and method can also be implemented on the basis of the original system architecture, and effectively utilize the original architecture, enabling cost-effectiveness.

In the system for browser data synchronization described above, the following conditions need to be met when allocating socket servers:

1. a load balance is achieved to a certain extent, namely, it is achieved that the number of long connections born on each socket server is roughly the same;

2. the distribution result has uniqueness and repeatability; namely, the distributor allocates a request to a certain socket server according to the user name of a login user and/or the machine hardware identification of a non-login user, and the pusher may locate which socket server the current connection is connected to according to the user name of a login user and/or the machine hardware identification of a non-login user;

3. when the system increases or decreases a socket server, the distribution of socket servers should have adaptability, that is, when the system increases or decreases the number of socket servers, it should be possible to accomplish reallocation of a request by a simple change.

To satisfy the above distribution conditions, the invention further proposes an apparatus for server distribution. The apparatus may be present in the distributor and the pusher described above and any other device and system that need server distribution.

Figure 9:
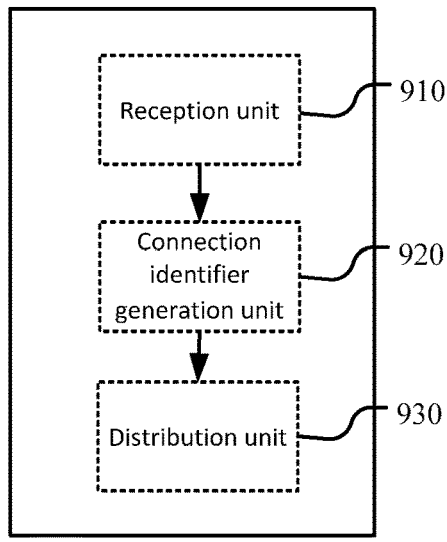
FIG. 9 is a structure diagram of an apparatus for server distribution according to an embodiment of the invention.

As shown in FIG. 9, the apparatus comprises: a reception unit 910, a connection identifier generation unit 920 and a distribution unit 930, wherein the reception unit 910 is configured to receive user identification information;

the connection identifier generation unit 920 is configured to generate a globally unique connection identifier according to the user identification information; and the distribution unit 930 is configured to, according to the number of servers and the connection identifier, distribute the connection indicated by the connection identifier to one of the multiple servers.

Therein, the user identification information comprises: the user name of a login user and/or the machine hardware identification of a non-login user; and the connection identifier is used for identifying a connection of each client, which is a specific value within a certain value range.

Therein, the connection identifier generation unit 920 adopts a cyclic redundancy check algorithm, for example, a 32-bit cyclic redundancy check algorithm.

In an embodiment of the invention, the distribution unit 930 further comprises an equally dividing subunit, an association subunit and an allocation subunit, wherein the equally dividing subunit is configured to equally divide the value range in which the connection identifier is located into a plurality of value intervals according to the number of servers;

the association subunit is configured to associate each server with one of the plurality of value intervals; and the allocation subunit is configured to, according to the value interval where the connection identifier is located, allocate the connection identifier to a server associated with its value interval.

When the number of servers is changed, the distribution unit 930 can reallocate the servers.

Optionally, the servers are socket servers.

The invention further provides a distributor containing the above described apparatus for distributing a plurality of servers.

Therein, the user identification information is contained in a connection request sent by a browser client to the distributor, and the distributor further comprises a sending unit configured to send the identification of a distributed server and a connection identifier to the browser client.

The invention further provides a push server containing the above described apparatus for distributing a plurality of servers.

Therein, the user identification information is contained in condition information sent by a cloud storage server to the push server, and the push server further comprises a sending unit configured to send a connection identifier and command information corresponding to the condition information to a distributed server.

The invention further provides a distribution system containing the above described apparatus for distributing a plurality of servers.

The system is configured to enable browser data synchronization, comprising: a cloud storage server, a push server, a socket server, a plurality of browser clients and a distributor, wherein the cloud storage server is configured to issue condition information and command information to the push server when there is a data update;

the push server is configured to determine a target client among the plurality of browser clients according to the condition information, and send the command information to a socket server corresponding to the target client;

the socket server is configured to establish a socket connection with a corresponding browser client respectively and send the command information to the target client; and the target client is configured to enable data synchronization between it and the cloud storage server according to the command information;

the distributor is configured to distribute to a browser client a socket server which has established a socket connection with it;

wherein in the push server and the distributor is contained the above described apparatus for distributing a plurality of servers.

Figure 10:
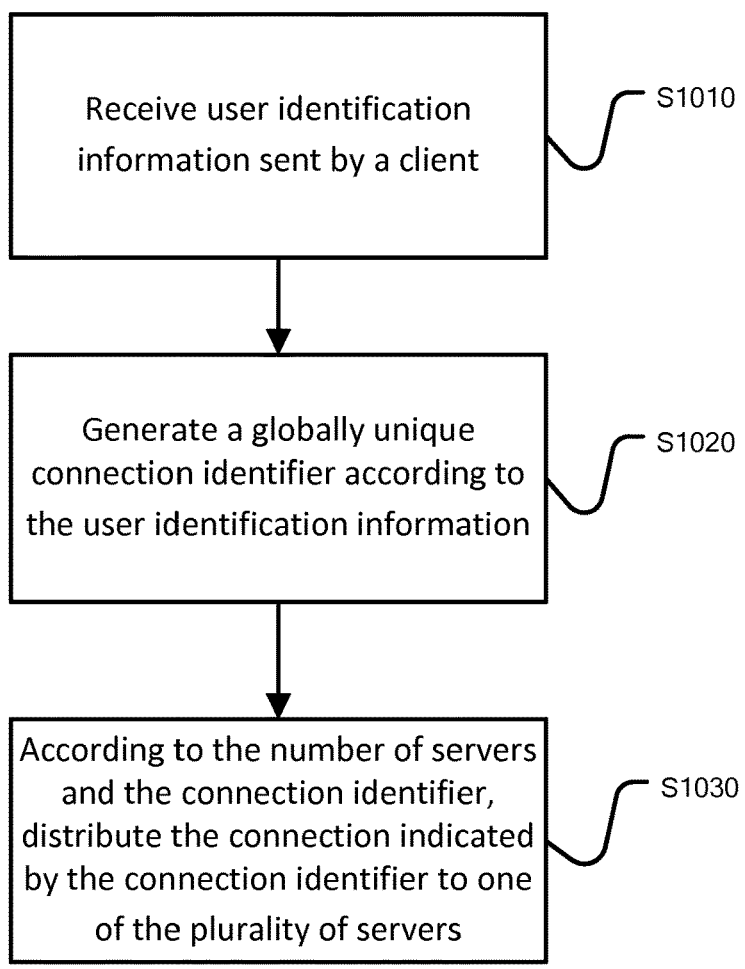
FIG. 10 is a flow chart of a method for server distribution according to an embodiment of the invention.

The invention further provides a method for distributing a plurality of servers in browser real-time synchronization, and as shown in FIG. 10, the method comprises the following steps:

step S1010: receiving user identification information;

step S1020: generating a globally unique connection identifier according to the user identification information; and step S1030: according to the number of servers and the connection identifier, distributing the connection indicated by the connection identifier to one of the multiple servers.

Therein, the user identification information comprises: the user name of a login user and/or the machine hardware identification of a non-login user; and the connection identifier is a specific value within a certain value range.

Therein, in the step S1020, a cyclic redundancy check algorithm, for example, a 32-bit cyclic redundancy check (CRC32) algorithm, may be adopted to generate a globally unique connection identifier according to the user identification information. The CRC32 algorithm is a consistent hashing algorithm, and according to such a consistent hashing algorithm, a comparatively dynamic, balanced and addressable way of server distribution can be realized. In an embodiment of the invention, according to the CRC32 algorithm, the user name of a login user and/or the machine hardware identification of a non-login user may be evenly, stably and uniquely converted into a specific value within the range of $0$-$2^{32}-1$.

In an embodiment of the invention, the step of, according to the number of servers and the connection identifier, distributing the connection indicated by the connection identifier to one of the multiple servers further comprises the following sub-steps:

equally dividing the value range in which the connection identifier is located into a plurality of value intervals according to the number of servers;

associating each server with one of the plurality of value intervals; and according to the value interval where the connection identifier is located, allocating the connection identifier to a server associated with its value interval.

Therein, the servers are socket servers.

In a further embodiment of the invention, the method further comprises the step of a browser client first sending a connection request containing the user identification information to a distributor, and after server distribution, further comprises the step of the distributor sending the identification of a distributed server and a connection identifier to the browser client.

In a further embodiment of the invention, the method further comprises the step of a cloud storage server first sending condition information containing the user identification information to a push server, and after server distribution, further comprises the step of the push server sending a connection identifier and command information corresponding to the condition information to a distributed server.

In a further embodiment of the invention, the method further comprises the following steps of:

a cloud storage server issuing condition information and command information to a push server when there is a data update;

the push server determining a target client among a plurality of browser clients according to the condition information, and sending the command information to a socket server corresponding to the target client;

the socket server establishing a socket connection with a corresponding browser client respectively and sending the command information to the target client; and the target client enabling data synchronization between it and the cloud storage server according to the command information.

Figure 11:
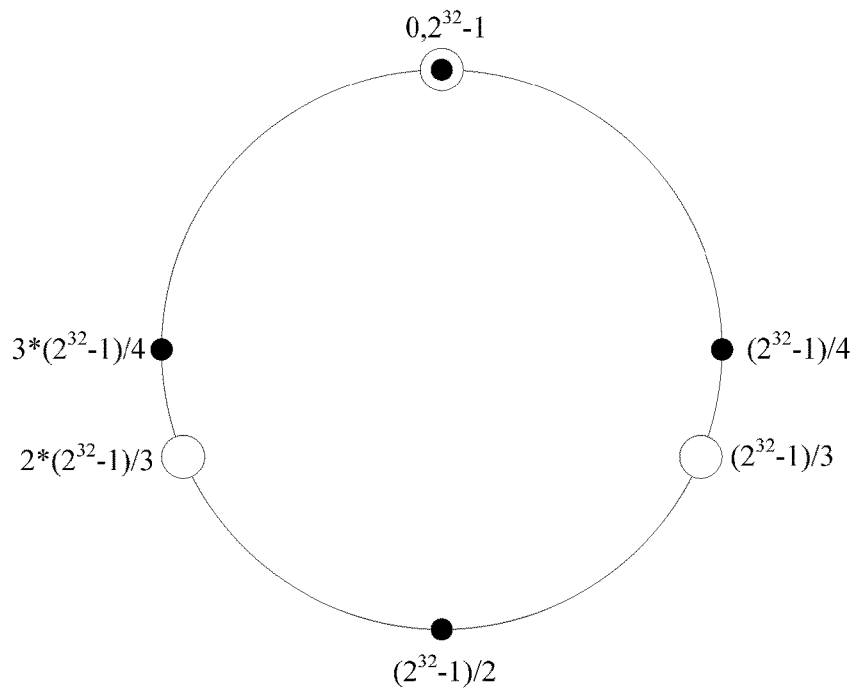
FIG. 11 is a principle diagram of server distribution of the invention.

The above described distribution policy may be better understood by a principle diagram of server distribution shown in FIG. 11. As shown in FIG. 11, an individual connection identifier is hashed to a specific value within the range of $0$-$2^{32}-1$, and distributed on a ring as shown in the figure. The starting point of the ring is 0, and the end point is $2^{32}-1$.

When the number of servers is three, the value range in which the connection identifier is located is equally divided into three value intervals, and a value is assigned to the three servers respectively. For example, if a first server is assigned 0 and $2^{32}-1$, then a second server is assigned $(2^{32}-1)/3$, and a third server is assigned $2*(2^{32}-1)/3$. According to the value interval within which the specific value of the connection identifier falls, it is assigned to a specific server for processing. For example, a value which falls between 0 and $(2^{32}-1)/3$ may be allocated to the first server, a value which falls between $(2^{32}-1)/3$ and $2*(2^{32}-1)/3$ may be allocated to the second server, and a value which falls between $2*(2^{32}-1)/3$ and $2^{32}-1$ may be allocated to the third server.

In addition, when the number of servers is changed, the servers are reallocated according to the sub-steps.

For example, when the number of servers is adjusted to be 4, the 4 servers may be assigned 0, $2^{32}-1$, $(2^{32}-1)/4$, $(2^{32}-1)/2$, and $3*(2^{32}-1)/4$, respectively. Then, a value which falls between 0 and $(2^{32}-1)/4$ may be allocated to the first server, a value which falls between $(2^{32}-1)/4$ and $(2^{32}-1)/2$ may be allocated to the second server, a value which falls between $(2^{32}-1)/2$ and $3*(2^{32}-1)/4$ may be allocated to the third server, and a value which falls between $3*(2^{32}-1)/4$ and $2^{32}-1$ may be allocated to the fourth server.

The above described method for server distribution can be applied in the system for browser real-time synchronization introduced above and other systems which need server distribution.

From the above, the invention enables dynamic, balanced and addressable server distribution. The algorithms and displays provided here are not inherently related to any specific computer, virtual system or other device. Various general-purpose systems may also be used with the teachings herein. According to the above description, the structure required for constructing such systems is obvious. In addition, the invention is not directed to any specific programming language. It should be understood that the content of the invention described herein may be carried out utilizing various programming languages, and that the above description for a specific language is for the sake of disclosing preferred embodiments of the invention.

In the method for enabling browser data synchronization of the invention described above in connection with accompanying drawings, in the connection establishing stage, if there are some browser clients which maliciously and ceaselessly issue requests to the distributor, then the distributor will ceaselessly allocate socket servers and corresponding connection identifiers to these users accordingly, and ceaselessly store the allocation information in the distribution information store. However, these browser clients do not really establish a connection, and therefore will occupy a plenty of storage resources and result in substantial waste of storage resources. Or, there exist some browser clients which do not issue requests to the distributor, but use illegal connection identifiers to attempt to connect to socket servers.

Figure 12:
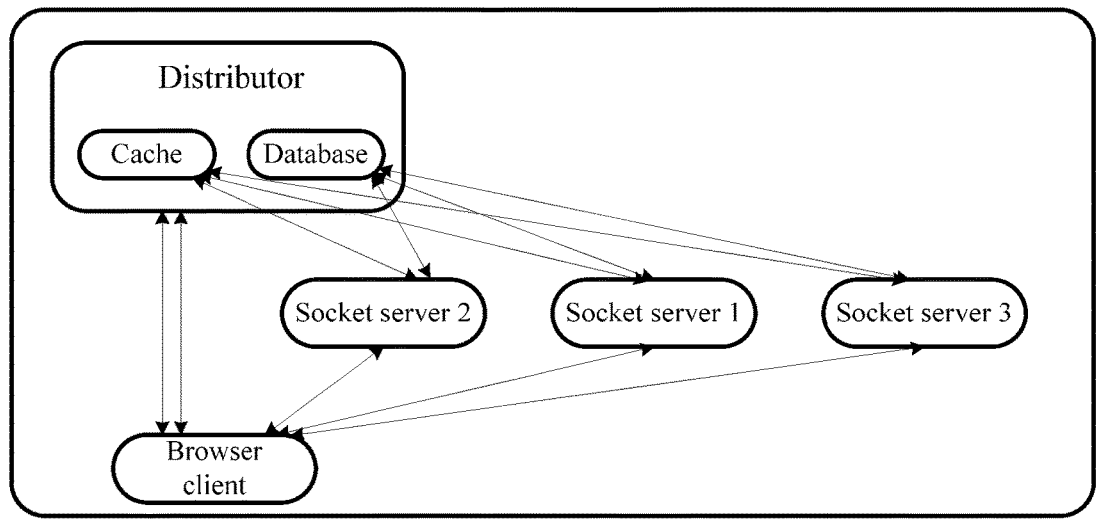
FIG. 12 is a structure diagram of a system for preventing a malicious connection according to an embodiment of the invention.

To put an end to occupation and shelving of a lot of storage resources and prevent an illegal connection from being generated, according to yet a further embodiment of the invention, there is proposed a system for preventing a malicious connection. FIG. 12 shows a structural diagram of the system.

With reference to FIG. 12, the system for preventing a malicious connection comprises a browser client, a distributor and a socket server.

The browser client is configured to send a connection request to the distributor to request establishing a connection with a socket server, and establish a connection with a corresponding socket server according to the allocation by the distributor.

The distributor is configured to receive a connection request sent by the browser client, allocate a socket server to the browser client according to the connection request, and allocate a globally unique connection identifier to the connection. The distributor sends the connection information of the allocated socket server and the connection identifier to the browser client, and caches information related with the connection request and the connection identifier into a cache. The information related with the connection request may comprise user identification information and user feature information contained in the connection request.

The socket server is configured to receive the connection identifier from the browser client via the established connection with the browser client, verify the received connection identifier according to the connection identifier cached in the cache, and keep or disconnect the connection according to the verification result.

If the result of verifying the connection identifier by the socket server is pass, then the already established connection is kept; and if the result is not pass, then the connection is disconnected. The verification refers to verifying whether the connection identifier received by the socket server from the browser client which submits a request is saved in the cache, and if it is saved, the verification result is legality, otherwise, the result is illegality.

That the browser client establishes a connection with a corresponding socket server according to allocation by the distributor comprises: the browser client establishing a connection with the socket server according to the connection information and the connection identifier received from the distributor, wherein the connection is a TCP connection.

The cache saves the information cached therein for a predetermined period of time and then frees it. The predetermined period of time is set for the cache in advance, and may be set for its size according to actual needs, for example, it may be 30 seconds. The cache automatically discards storage content exceeding this duration, and frees the storage space, and the size of the period of time may be set according to actual needs.

The cache may be implemented using any suitable caching technology, for example, may be implemented using a redis. Within the redis, an information list taking a connection identifier as a key may be maintained, wherein there may be comprised information such as connection identifiers, user identification information, machine hardware identifications, version numbers, etc. The redis is a key value storage system and a high-performance key value database, and the types of value that it supports storing is relatively many, including string, list, set and zset (ordered set).

If within another predetermined period of time after the browser client establishes a connection with the socket server, the browser client does not send the connection identifier to the socket server, then the socket server disconnects the established connection. This predetermined period of time is set in advance, for example, may be 10 seconds, and the size of the period of time may be set according to actual needs. By setting the predetermined period of time, it may be possible to save system resources and prevent a malicious connection from being generated.

That the distributor allocates a socket server to the browser client according to the connection request comprises: the distributor performing calculation using a preset algorithm based on user identification information contained in the connection request received from the browser client to obtain a value, and allocating a socket server to the browser client submitting the connection request according to the value. The value is globally unique, i.e., a connection identifier.

The user identification information comprises: the user name of a login user, and the machine hardware identification of a non-login user. For a login user, his user identification information may comprise a user name, whereas for a non-login user, his user identification information may comprise the user's machine hardware identification. For a login user, the user identification information may be a string, wherein in addition to the user name of the login user, the string further comprises information such as login time and verification characters, etc. The user name is the user's unique identification number, i.e., a figure, for representing a user. The verification characters are generated according to the user name, that is, it may be judged by the verification characters whether the user identification information has been changed. For a non-login user, the user identification information may comprise a machine hardware identification of the non-login user, wherein the machine hardware identification is the unique identification of a machine, and generated with a Hash function by the client through the configurations of the user's machine and system, etc.

In addition, for subsequently screening out a target client, the connection request may further comprise user feature information, for example, IP address information, browser version information, or user classification information, etc., wherein the user feature information such as the browser version number, the user classification information or the IP address information, etc. may be used for subsequently screening out a client.

When the browser client establishes a connection with a socket server, the socket server obtains a resource identifier identifying the connection relationship between the socket server and the browser client.

After the verification of the connection identifier by the socket server is successful, it extracts information related with the connection request and the connection identifier from the cache, and stores the extracted information together with the obtained resource identifier in a database of the distributor.

The database may be implemented using any suitable database, for example, the database may be implemented by selecting a document type database, in this invention, preferably by selecting a database without limitation to the number of data columns, such that data items are flexible, which is beneficial for the compatibility with the deficiency and expansion of data items. For example, it may be possible to use a MongoDB cluster to implement the database, and it may also be implemented using a similar database such as CouchDB, etc. In particular, employing the form of a cluster may achieve the following advantages: 1. distributed storage, which increases the write and update speed; 2. distributed query computation, which increases the query efficiency; 3. redundancy backup within the cluster, which increases the reliability of data.

The system further comprises a cloud storage server and a push server, wherein the cloud storage server is configured to issue condition information and command information to the push server when there is a data update; the push server is configured to determine a target client according to the condition information, and send the command information to the target client via the socket server; and the target client is configured to enable data synchronization between it and the cloud storage server according to the command information, and the target client is a client among a plurality of browser clients.

The system for preventing a malicious connection of the invention constructs the distribution information store of the distributor to comprise a cache and a database, wherein a predetermined period of time is set for the cache, and the cache saves the information cached therein for the predetermined time and then frees it; on the other hand, if within another predetermined period of time after establishing a connection with the socket server, the browser client does not send the connection identifier to the socket server, then the socket server disconnects the established connection, thereby putting an end to occupation and shelving of a lot of storage resources and preventing an illegal connection from being generated.

Figure 13:
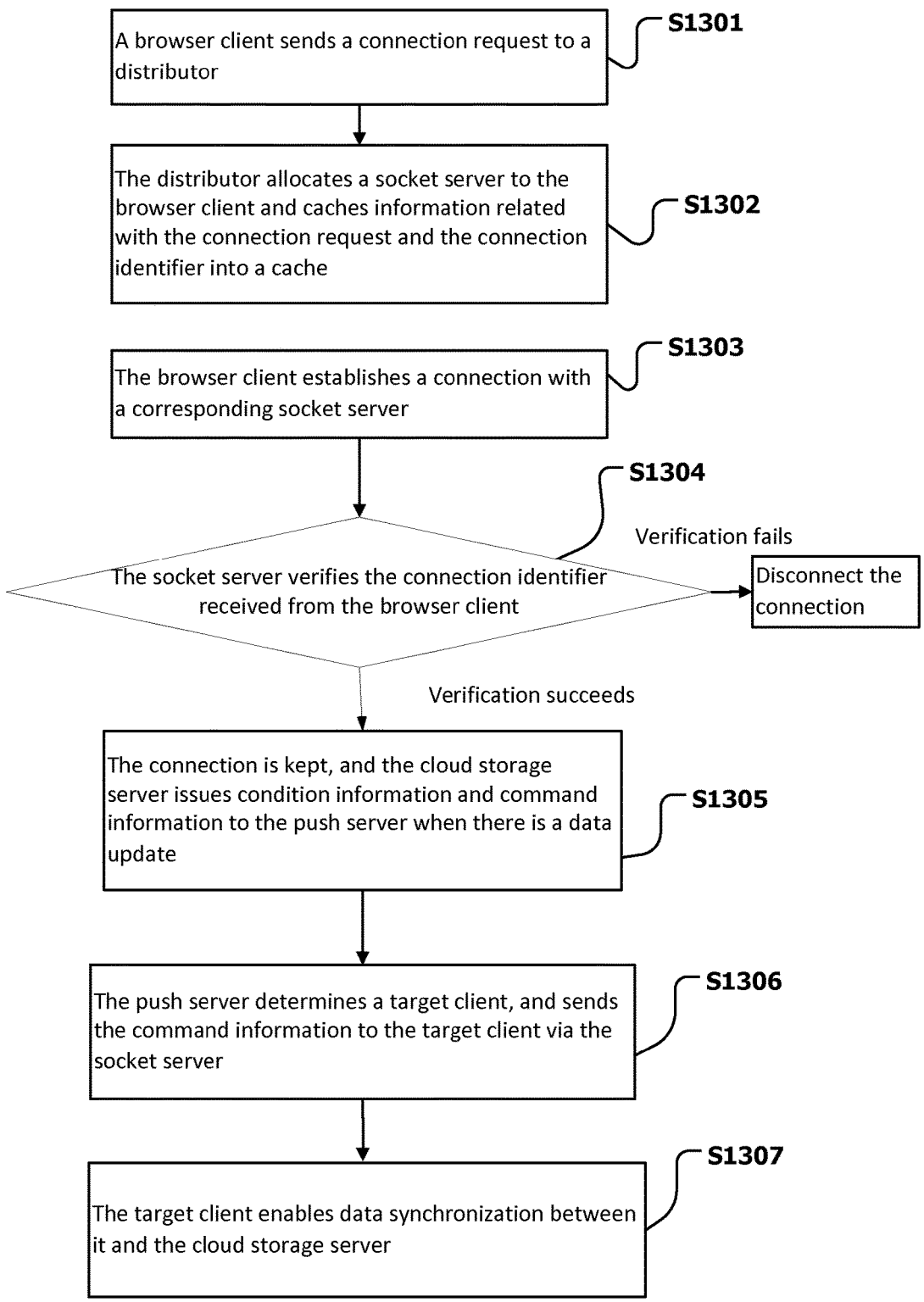
FIG. 13 is a flow chart of a method for preventing a malicious connection according to an embodiment of the invention.

According to still another embodiment of the invention, there is further proposed a method for preventing a malicious connection. FIG. 13 shows a flow chart of this method.

With reference to FIG. 13, the method for preventing a malicious connection comprises the following steps.

In step S1301, a browser client sends a connection request to a distributor to request establishing a connection with a socket server.

In step S1302, the distributor receives a connection request sent by the browser client, allocate a socket server to the browser client according to the connection request, and allocate a globally unique connection identifier to the connection; the distributor sends the connection information of the allocated socket server and the connection identifier to the browser client, and caches information related with the connection request and the connection identifier into a cache.

In this step, the distributor performs calculation using a preset algorithm based on user identification information contained in the connection request received from the browser client to obtain a value, and allocates a socket server to the browser client submitting the connection request according to the value. The value is globally unique, i.e., a connection identifier. By setting the predetermined period of time, it may be possible to save system resources and prevent a malicious connection from being generated.

The user identification information comprises: the user name of a login user, and the machine hardware identification of a non-login user. For a login user, his user identification information may comprise a user name, whereas for a non-login user, his user identification information may comprise the user's machine hardware identification. For a login user, the user identification information may be a string, wherein in addition to the user name of the login user, the string further comprises information such as login time and verification characters, etc. The user name is the user's unique identification number, i.e., a figure, for representing a user. The verification characters are generated according to the user name, that is, it may be judged by the verification characters whether the user identification information has been changed. For a non-login user, the user identification information may comprise a machine hardware identification of the non-login user, wherein the machine hardware identification is the unique identification of a machine, and generated with a Hash function by the browser client through the configurations of the user's machine and system, etc.

In addition, for subsequently screening out a target client, the connection request may further comprise user feature information, for example, IP address information, browser version information, or user classification information, etc., wherein the user feature information such as the browser version number, the user classification information or the IP address information, etc. may be used for subsequently screening out a client.

The cache saves the information cached therein for a predetermined period of time and then frees it. The predetermined period of time is set for the cache in advance, and may be set for its size according to actual needs, for example, it may be 30 seconds. The cache automatically discards storage content exceeding this duration, and frees the storage space.

The cache may be implemented using any suitable caching technology, for example, may be implemented using a Redis. Within the Redis, an information list taking a resource identifier as a key may be maintained, wherein there may be comprised information such as user identification information, machine hardware identifications, version numbers, etc.

In step S1303, the browser client establishes a connection with a corresponding socket server according to allocation by the distributor.

When the browser client establishes a connection with a socket server, the socket server obtains a resource identifier identifying the connection relationship between the socket server and the browser client.

In step S1304, the socket server receives the connection identifier from the browser client via the established connection with the browser client, verifies the received connection identifier according to the connection identifier cached in the cache, and keeps or disconnects the connection according to the verification result.

If within another predetermined period of time after the browser client establishes a connection with the socket server, the browser client does not send the connection identifier to the socket server, then the socket server disconnects the established connection. This predetermined period of time is set in advance, for example, may be 10 seconds, and the size of the period of time may be set according to actual needs.

In this step, if the result of verifying the connection identifier by the socket server is pass, then the already established connection is kept; and if the result is not pass, then the connection is disconnected. The verification refers to verifying whether the connection identifier received by the socket server from the browser client which submits a request is saved in the cache, and if it is saved, the verification result is legality, otherwise, the result is illegality.

After the verification of the connection identifier by the socket server is successful, it extracts information related with the connection request and the connection identifier from the cache, and stores the extracted information together with the obtained resource identifier in a database of the distributor.

The database may be implemented using any suitable database, for example, the database may be implemented by selecting a document type database, in this invention, preferably by selecting a database without limitation to the number of data columns, such that data items are flexible, which is beneficial for the compatibility with the deficiency and expansion of data items. For example, it may be possible to use a MongoDB cluster to implement the database, and it may also be implemented using a similar database such as CouchDB, etc. The method further comprises: step S1305, in which the cloud storage server issues condition information and command information to the push server when there is a data update;

step S1306, in which the push server determines a target client according to the condition information, and sends the command information to the target client via the socket server; and step S1307, in which the target client enables data synchronization between it and the cloud storage server according to the command information, and the target client is a client among a plurality of browser clients.

According to still another embodiment of the invention, there is further provided a system for preventing a malicious connection. The system comprises: a cloud storage server, a push server, a plurality of browser clients, a distributor and a socket server.

The cloud storage server is configured to issue condition information and command information to the push server when there is a data update.

The push server is configured to determine a target client among the plurality of browser clients according to the condition information, and send the command information to the target client via a socket server.

The target client is configured to enable data synchronization between it and the cloud storage server according to the command information.

The distributor connects the plurality of browser clients and socket servers, and is configured to receive connection requests for being connected with socket servers sent by the plurality of browser clients, allocate socket servers to the browser clients according to the connection requests, and allocate globally unique connection identifiers to the connections. The distributor sends the connection information of the allocated socket servers and the connection identifiers to the plurality of browser clients, and caches information related with the connection requests and the connection identifiers into a cache.

Therein, the distributor performs calculation using a preset algorithm based on user identification information contained in the connection request received from a browser client to obtain a value, and allocates a socket server to the browser client submitting the connection request according to the value, wherein the value is globally unique, i.e., a connection identifier. The user identification information comprises: the user name of a login user, and the machine hardware identification of a non-login user.

The socket server connects the distributor, the push server and the plurality of browser clients, and is configured to receive the connection identifiers from the plurality of browser clients and verify them, and keep or disconnect the connections with the plurality of browser clients according to the verification result, and to forward the command information from the push server to the target client. The verification refers to verifying whether the connection identifier received by the socket server from the browser client which submits a request is saved in the cache, and if it is saved, the verification result is legality, otherwise, the result is illegality.

Therein, the connection is a TCP connection, and if the result of verifying the connection identifier by the socket server is pass, then the already established connection is kept; and if the result is not pass, then the connection is disconnected.

The cache saves the information cached therein for a first predetermined period of time and then frees it. If within a second predetermined period of time after the browser client establishes a connection with the socket server, the browser client does not send the connection identifier to the socket server, then the socket server disconnects the established connection.

When the browser client establishes a connection with the socket server, the socket server obtains a resource identifier identifying the connection relationship between the socket server and the browser client.

After the verification of the connection identifier by the socket server is successful, it extracts information related with the connection request and the connection identifier from the cache, and stores the extracted information together with the obtained resource identifier in a database of the distributor.

The target client is a client among the plurality of browser clients.

Figure 14:
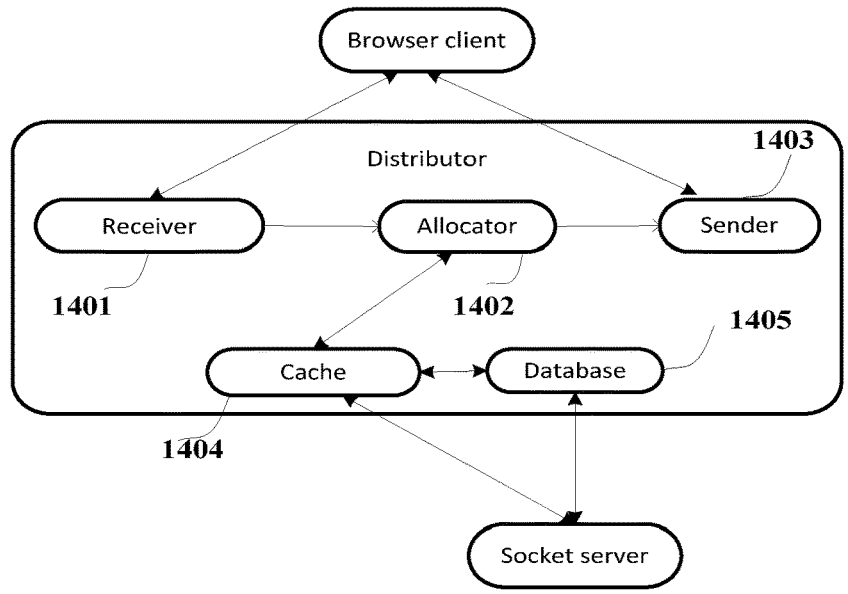
FIG. 14 is a structure diagram of a distributor for distributing a plurality of socket servers according to an embodiment of the invention.

According to still another embodiment of the invention, there is further provided a distributor for distributing a plurality of socket servers. FIG. 14 is a structural block diagram of the distributor. With reference to FIG. 14, the distributor comprises: a receiver 1401 configured to receive a connection request sent by a browser client; an allocator 1402 configured to allocate a socket server to the browser client according to the connection request, and allocate a globally unique connection identifier to the connection; a sender 1403 configured to send the connection information of the allocated socket server and the connection identifier to the browser client; a cache 1404 configured to cache information related with the connection request and the connection identifier; and a database 1405 configured to store information related with the connection request, the connection identifier, and a resource identifier identifying the connection relationship between the socket server and the browser client obtained by the socket server after the verification of the connection identifier is successful, wherein the cache 1404 saves the information cached therein for a first predetermined period of time and then frees it.

Figure 15:
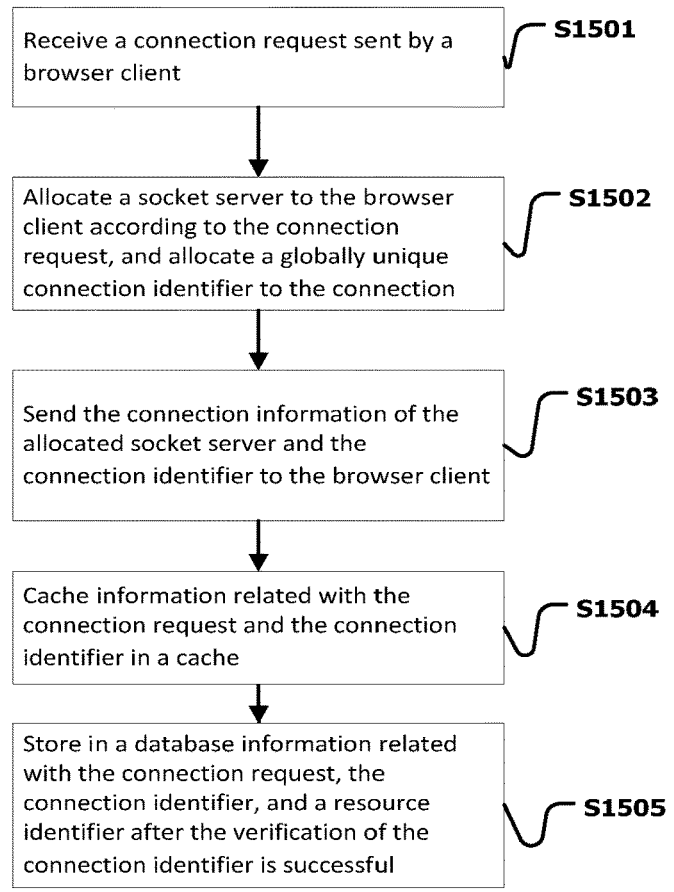
FIG. 15 is a flow chart of a method for distributing a plurality of socket servers according to an embodiment of the invention.

According to still another embodiment of the invention, there is further provided a method for distributing a plurality of socket servers. FIG. 15 is a flow chart of this method. With reference to FIG. 15, the method comprises the following steps: step 1501, receiving a connection request sent by a browser client; step 1502, allocating a socket server to the browser client according to the connection request, and allocating a globally unique connection identifier to the connection; step 1503, sending the connection information of the allocated socket server and the connection identifier to the browser client; step 1504, caching information related with the connection request and the connection identifier in a cache; and step 1505, storing in a database information related with the connection request, the connection identifier, and a resource identifier identifying the connection relationship between the socket server and the browser client obtained by the socket server after the verification of the connection identifier is successful.

Therein, the cache saves the information cached therein for a first predetermined period of time and then frees it.

Figure 17:
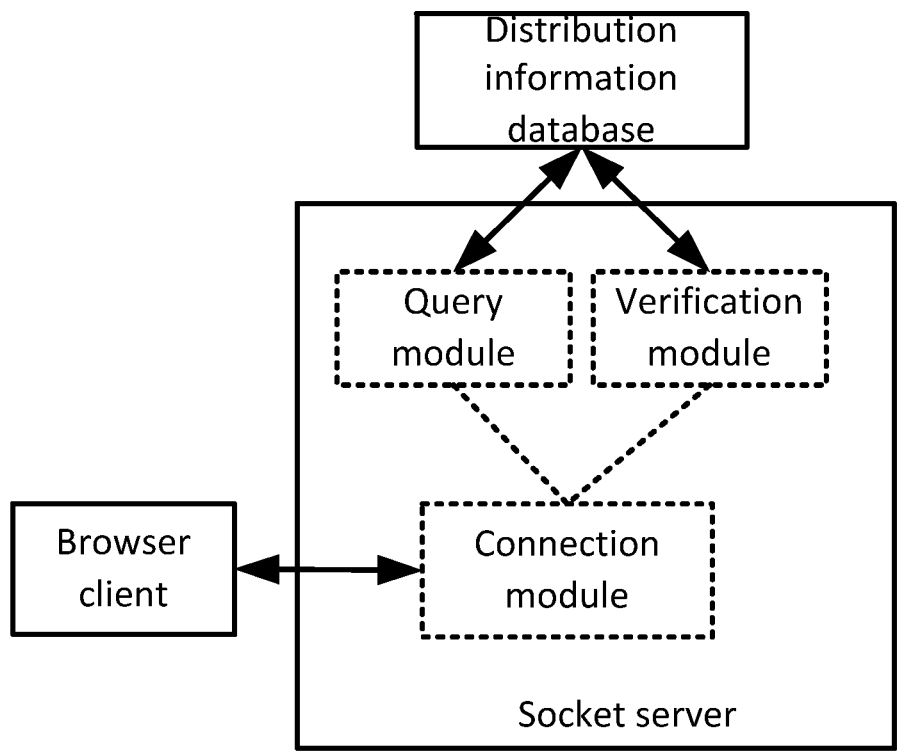
FIG. 17 is a structural schematic diagram of a socket server according to an embodiment of the invention.

As described above, a socket server can play a key role when enabling information push between a cloud storage server and a target client. FIG. 17 is a structural schematic diagram of a socket server according to an embodiment of the invention. As shown in FIG. 17, it is generally needed for the socket server to comprise a connection module which is configured to establish socket connections with a plurality of browser clients and conduct information interaction with browser clients with which connections have been established.

As described above, the connection module is configured to establish a socket connection with a browser client. In particular, when a browser client initiates a connection with the socket server, the connection module accepts the connection, and obtains the resource identifier of the connection. The resource identifier is an identifier generated by a socket server system and configured to identify a connection between the browser client and the socket server.

In a particular implementation, a browser client submits a connection request to the distributor and this connection request comprises at least user identification information. The distributor performs calculation using a preset algorithm from the user identification information to obtain a value, and allocates a socket server to the browser client submitting the connection request according to the value, wherein the value is globally unique, i.e., a connection identifier; the distributor then sends the connection information of the socket server and the connection identifier to the browser client submitting the connection request, and the browser client submitting the connection request establishes a connection with the connection module of a corresponding socket server according to the received connection information of the socket server and the connection identifier.

As described above, in the system for browser data synchronization there may be disposed a distribution information database. According to a particular implementation, when the system comprises a distributor, the distribution information database may be disposed in the distributor. In the distribution information database is stored user identification information. In the above procedure of establishing a socket connection, the browser client submitting the request may further communicate the connection identifier to a corresponding socket server according to the received connection information of the socket server. At this point, the socket server may further comprise a verification module to verify the received connection identifier. When conducting verification, the verification module queries the connection identifier in the distribution information database to verify whether the connection identifier is present in the distribution information database, and thereby verify whether the browser client which requests establishing a socket connection with the socket server is legal or not.

When the verification module verifies that the connection identifier is present in the distribution information database, the socket server stores the resource identifier in the distribution information database. When the verification module verifies that the connection identifier is not present in the distribution information database, the verification module instructs the connection module to disconnect the connection with the browser client.

As described above, when the push server sends the condition information and the command information to a socket server allocated to a target client, the socket server queries the distribution information database according to the condition information to determine the target client. When the condition information comprises user identification information, the socket server conducts a query according to the user identification information. When the distribution information database further saves a resource identifier, the socket server queries the resource identifier in the distribution information database according to the condition information to determine the target client. At this point, the socket server further comprises a query module which completes the above query procedure. The socket server of the invention employs an asynchronous scheduling mode when sending the command information to the target client. That is, when the socket server has received the command information, and has determined the target client according to the condition information, it employs an asynchronous mode to send the command information to the target client. By "asynchronous mode", it means that when there are more than one target clients, after sending a command message to one of the clients, the connection module will not wait for its reception and confirmation and directly send the command message to the next client. The procedure proceeds continuously, thereby achieving efficient sending, in turn shortening the execution time, increasing the system efficiency and reducing the difference in time at which the message is received by different clients, and improving the real time nature of a service.

Figure 18:
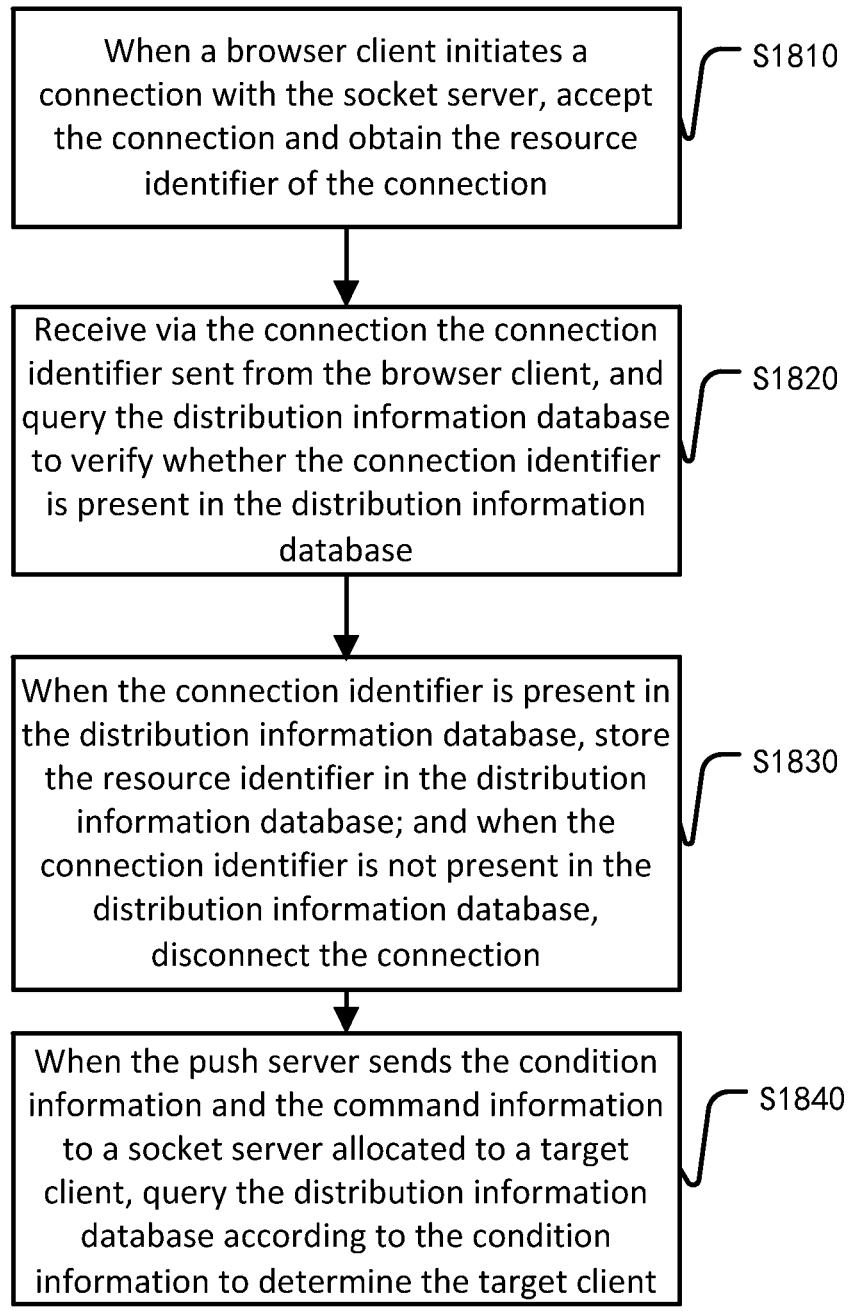
FIG. 18 is a flow chart of a socket service method applied in a socket server according to an embodiment of the invention.

In the following, a particular implementation of a socket service method which is applied in a socket server will be described in particular with reference to FIG. 18. It can be seen from the above description of the socket server that the socket service method of the invention which is applied in a socket server comprises at least step S1810, in which when a browser client initiates a connection with the socket server, the socket server accepts the connection and obtains the resource identifier of the connection.

According to a particular implementation of the invention, after the step S1810, the socket service method further comprises step S1820, in which the socket server receives via the connection the connection identifier sent from the browser client, and queries the distribution information database to verify whether the connection identifier is present in the distribution information database. After the step S1820, preferably, the socket service method further comprises step S1830, in which when the connection identifier is present in the distribution information database, the socket server stores the resource identifier in the distribution information database; and when the connection identifier is not present in the distribution information database, the socket server disconnects the connection.

According to a further implementation of the invention, the socket service method further comprises step S1840, in which when the push server sends the condition information and the command information to a socket server allocated to a target client, the socket server queries the distribution information database according to the condition information to determine the target client.

The step S1840 is preferably that the socket server queries a resource identifier in the distribution information database according to the condition information to determine the target client.

According to a further implementation, the socket service method further comprises: when the socket server has received the command information and has determined the target client according to the condition information, and there are more than one target clients, after sending a command message to one of the clients, the socket server will not wait for its reception and confirmation and directly send the command message to the next client. It can be seen from the foregoing description that one socket server in the invention may connect with a plurality of browser clients simultaneously, and the connection states between the individual browser clients and the socket server may also be different. Moreover, target clients specified by different condition information may also be different. Therefore, in the socket service method of the invention, for various browser clients, different steps may be performed in response to different condition information and command information from the push server.

When particularly implementing the above described socket server with an asynchronous scheduling mode and its socket service method, it may be possible to use javascript language to develop the socket server in a Linux-CentOS environment NodeJS, and the connection module of the socket server employs the Transmission Control Protocol (TCP) to connect with a browser client and send command information. As compared to the web socket which generally adopts the http protocol, adopting the Tcp protocol may reduce the resource consumption of the system and improve the service processing capability of the system.

To further save system resources, the command information pushed by the push server 2 to a browser client 3 is a notification message. In such a case, the browser client is further configured to, after receiving the notification message pushed by the push server, establish a connection with the cloud storage server, download updated data content from the cloud storage server, and perform synchronization of local data content according to the downloaded data content. By communicating the notification message, the communicated data amount may be decreased, and the occupancy of system resources may be reduced.

Of course, the command information pushed by the push server to a target client may also be a content message, namely, the content message contain updated data content. In such a case, after receiving the content message pushed by the push server, the target client extracts the updated data content from the content message, and performs synchronization of local data content according to the extracted data content. By communicating the content message, the content message may be directly pushed to the client, information is passed quickly, and the step is simple.

In order to enable support of multiple languages and conveniently invoke a text, an HTTP interface is employed between the push server and the cloud storage server, other suitable interface may also be employed, and this will not be limited by the invention.

Embodiments of the individual components of the invention may be implemented in hardware, or in a software module running on one or more processors, or in a combination thereof. It will be appreciated by those skilled in the art that, in practice, some or all of the functions of some or all of the components in a device for browser data synchronization according to individual embodiments of the invention may be realized using a microprocessor or a digital signal processor (DSP). The invention may also be implemented as a device or apparatus program (e.g., a computer program and a computer program product) for carrying out a part or all of the method as described herein. Such a program implementing the invention may be stored on a computer readable medium, or may be in the form of one or more signals. Such a signal may be obtained by downloading it from an Internet website, or provided on a carrier signal, or provided in any other form.

Figure 19:
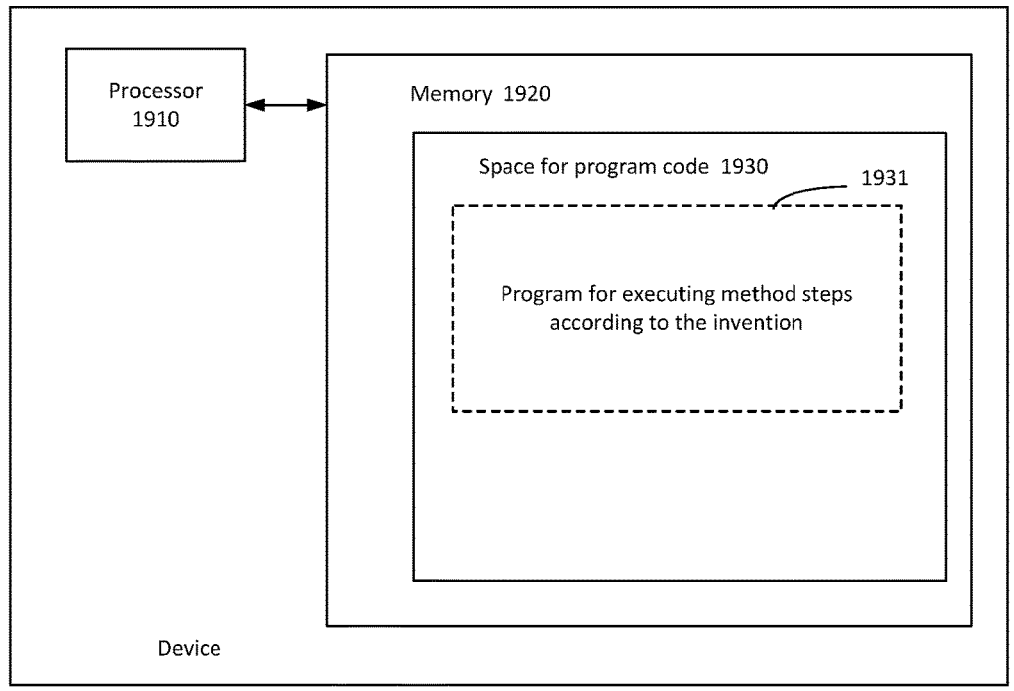
FIG. 19 shows schematically a block diagram of a device for performing a method according to the invention.
Figure 20:
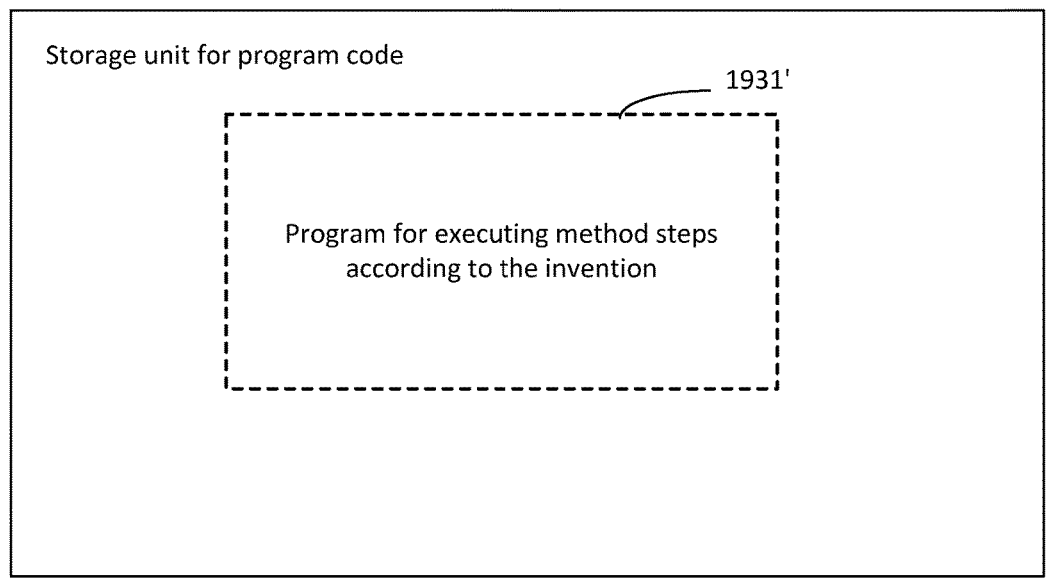
FIG. 20 shows schematically a storage unit for retaining or carrying a program code implementing a method according to the invention.

For example, FIG. 19 shows a device which may carry out the method according to the invention, e.g., an application server, a client, etc. The device traditionally comprises a processor 1910 and a computer program product or a computer readable medium in the form of a memory 1920. The memory 1920 may be an electronic memory such as a flash memory, an EEPROM (electrically erasable programmable read-only memory), an EPROM, a hard disk or a ROM. The memory 1920 has a memory space 1930 for a program code 1931 for carrying out any method steps in the methods as described above. For example, the memory space 1930 for a program code may comprise individual program codes 1931 for carrying out individual steps in the above methods, respectively. The program codes may be read out from or written to one or more computer program products. These computer program products comprise such a program code carrier as a hard disk, a compact disk (CD), a memory card or a floppy disk. Such a computer program product is generally a portable or stationary storage unit as described with reference to FIG. 20. The storage unit may have a memory segment, a memory space, etc. arranged similarly to the memory 1920 in the device of FIG. 19. The program code may for example be compressed in an appropriate form. In general, the storage unit comprises a computer readable code 1931', i.e., a code which may be read by e.g., a processor such as 1910, and when run by a server, the codes cause the server to carry out individual steps in the methods described above.

"An embodiment", "the embodiment" or "one or more embodiments" mentioned herein implies that a particular feature, structure or characteristic described in connection with an embodiment is included in at least one embodiment of the invention. In addition, it is to be noted that, examples of a phrase "in an embodiment" herein do not necessarily all refer to one and the same embodiment.

In the specification provided herein, a plenty of particular details are described. However, it can be appreciated that an embodiment of the invention may be practiced without these particular details. In some embodiments, well known methods, structures and technologies are not illustrated in detail so as not to obscure the understanding of the specification.

It is to be noted that the above embodiments illustrate rather than limit the invention, and those skilled in the art may design alternative embodiments without departing the scope of the appended claims. In the claims, any reference sign placed between the parentheses shall not be construed as limiting to a claim. The word "comprise" does not exclude the presence of an element or a step not listed in a claim. The word "a" or "an" preceding an element does not exclude the presence of a plurality of such elements. The invention may be implemented by means of a hardware comprising several distinct elements and by means of a suitably programmed computer. In a unit claim enumerating several means, several of the means may be embodied by one and the same hardware item. Use of the words first, second, and third, etc. does not mean any ordering. Such words may be construed as naming.

Furthermore, it is also to be noted that the language used in the description is selected mainly for the purpose of readability and teaching, but not selected for explaining or defining the subject matter of the invention. Therefore, for those of ordinary skills in the art, many modifications and variations are apparent without departing the scope and spirit of the appended claims. For the scope of the invention, the disclosure of the invention is illustrative, but not limiting, and the scope of the invention is defined by the appended claims.

Embodiments of the invention disclose: A1: An apparatus for distributing a plurality of servers comprising: a reception unit, a connection identifier generation unit and a distribution unit, wherein the reception unit is configured to receive user identification information; the connection identifier generation unit is configured to generate a globally unique connection identifier according to the user identification information; and the distribution unit is configured to, according to the number of servers and the connection identifier, distribute the connection indicated by the connection identifier to one of the plurality of servers. A2: The apparatus as claimed in A1, wherein the user identification information comprises: the user name of a login user and/or the machine hardware identification of a non-login user. A3: The apparatus as claimed in A1, wherein the connection identifier is a specific value within a certain value range. A4: The apparatus as claimed in A1, wherein the connection identifier generation unit adopts a cyclic redundancy check algorithm. A5: The apparatus as claimed in A4, wherein the cyclic redundancy check algorithm is of 32 bits. A6: The apparatus as claimed in A1, wherein the distribution unit further comprises an equally dividing subunit, an association subunit and an allocation subunit, wherein the equally dividing subunit is configured to equally divide the value range in which the connection identifier is located into a plurality of value intervals according to the number of servers; the association subunit is configured to associate each server with one of the plurality of value intervals; and the allocation subunit is configured to, according to the value interval where the connection identifier is located, allocate the connection indicated by the connection identifier to a server associated with its value interval. A7: The apparatus as claimed in A1, wherein when the number of servers is changed, the distribution unit reallocates the servers. A8: The apparatus as claimed in A1, wherein the servers are socket servers.

Embodiments of the invention further disclose: B9: A distributor comprising the apparatus for distributing a plurality of servers as claimed in any of A1-A8. B10: The distributor as claimed in B9, wherein the user identification information is contained in a connection request sent by a browser client to the distributor, and the distributor further comprises a sending unit configured to send the identification of a distributed server and a connection identifier to the browser client.

Embodiments of the invention further disclose: C11: A push server comprising the apparatus for distributing a plurality of servers as claimed in any of A1-A8. C12: The push server as claimed in C11, wherein the user identification information is contained in condition information sent by a cloud storage server to the push server, and the push server further comprises a sending unit configured to send a connection identifier and command information corresponding to the condition information to a distributed server.

Embodiments of the invention further disclose: D13: A distribution system comprising the apparatus for distributing a plurality of servers as claimed in any of A1-A8. D14: The system as claimed in D13, configured to enable browser data synchronization, wherein the system comprises: a cloud storage server, a push server, a socket server, a plurality of browser clients and a distributor, wherein the cloud storage server is configured to issue condition information and command information to the push server when there is a data update; the push server is configured to determine a target client among the plurality of browser clients according to the condition information, and send the command information to a socket server corresponding to the target client; the socket server is configured to establish a socket connection with a corresponding browser client respectively and send the command information to the target client; and the target client is configured to enable data synchronization between it and the cloud storage server according to the command information; the distributor is configured to distribute to a browser client a socket server which has established a socket connection with it; wherein in the push server and the distributor is contained the apparatus for distributing a plurality of servers as claimed in A1-A8.

Embodiments of the invention further disclose: E15: A method for distributing a plurality of servers, comprising the following steps: receiving user identification information; generating a globally unique connection identifier according to the user identification information; and according to the number of servers and the connection identifier, distributing the connection indicated by the connection identifier to one of the plurality of servers. E16: The method as claimed in E15, wherein the user identification information comprises: the user name of a login user and/or the machine hardware identification of a non-login user. E17: The method as claimed in E15, wherein the connection identifier is a specific value within a certain value range. E18: The method as claimed in E15, wherein the connection identifier is generated adopting a cyclic redundancy check algorithm according to the user identification information. E19: The method as claimed in E18, wherein the cyclic redundancy check algorithm is of 32 bits. E20: The method as claimed in E15, wherein the step of, according to the number of servers and the connection identifier, distributing the connection indicated by the connection identifier to one of the plurality of servers further comprises the following substeps: equally dividing the value range in which the connection identifier is located into a plurality of value intervals according to the number of servers; associating each server with one of the plurality of value intervals; and according to the value interval where the connection identifier is located, allocating the connection indicated by the connection identifier to a server associated with its value interval. E21: The method as claimed in E20, wherein when the number of servers is changed, the servers are reallocated. E22: The method as claimed in E15, wherein the servers are socket servers. E23: The method as claimed in any of E15-E22, wherein the method further comprises the step of a browser client sending a connection request containing the user identification information to a distributor, and after server distribution, further comprises the step of the distributor sending the identification of a distributed server and a connection identifier to the browser client. E24: The method as claimed in any of E15-E22, wherein the method further comprises the step of a cloud storage server sending condition information containing the user identification information to a push server, and after server distribution, further comprises the step of the push server sending a connection identifier and command information corresponding to the condition information to a distributed server. E25: The method as claimed in any of E15-E22, wherein the method further comprises the following steps of: a cloud storage server issuing condition information and command information to a push server when there is a data update; the push server determining a target client among a plurality of browser clients according to the condition information, and sending the command information to a socket server corresponding to the target client; the socket server establishing a socket connection with a corresponding browser client respectively and sending the command information to the target client; and the target client enabling data synchronization between it and the cloud storage server according to the command information.

Embodiments of the invention further disclose: F1: A system for preventing a malicious connection comprising: a browser client configured to send a connection request to a distributor to request establishing a connection with a socket server, and establish a connection with a corresponding socket server according to the allocation by the distributor; the distributor configured to receive a connection request sent by the browser client, allocate a socket server to the browser client according to the connection request, and allocate a globally unique connection identifier to the connection, the distributor sending the connection information of the allocated socket server and the connection identifier to the browser client, and caching information related with the connection request and the connection identifier into a cache; and the socket server configured to receive the connection identifier from the browser client via the established connection with the browser client, verify the received connection identifier according to the connection identifier cached in the cache, and keep or disconnect the connection according to the verification result. F2: The system as claimed in F1, wherein that the browser client establishes a connection with a corresponding socket server according to allocation by the distributor comprises: the browser client establishing a connection with the socket server according to the connection information and the connection identifier received from the distributor. F3: The system as claimed in F2, wherein the connection is a Transmission Control Protocol TCP connection, and if the result of verifying the connection identifier by the socket server is pass, then the already established connection is kept; and if the result is not pass, then the connection is disconnected. F4: The system as claimed in any of F1-F3, wherein the cache saves the information cached therein for a first predetermined period of time and then frees it. F5: The system as claimed in F4, wherein if within a second predetermined period of time after the browser client establishes a connection with the socket server, the browser client does not send the connection identifier to the socket server, then the socket server disconnects the established connection. F6: The system as claimed in F1, wherein that the distributor allocates a socket server to the browser client according to the connection request and allocates a globally unique connection identifier to the connection comprises: the distributor performing calculation using a preset algorithm based on user identification information contained in the connection request received from the browser client to obtain a connection identifier, and allocating a socket server to the browser client submitting the connection request according to the connection identifier. F7: The system as claimed in F1, wherein when the browser client establishes a connection with the socket server, the socket server obtains a resource identifier identifying the connection relationship between the socket server and the browser client. F8: The system as claimed in F1, wherein after the verification of the connection identifier by the socket server is successful, it extracts information related with the connection request and the connection identifier from the cache, and stores the extracted information together with the obtained resource identifier in a database of the distributor. F9: The system as claimed in F8, wherein the user identification information comprises: the user name of a login user, and the machine hardware identification of a non-login user. F10: The system as claimed in F4, wherein the verification refers to verifying whether the connection identifier received by the socket server from the browser client which submits a request is saved in the cache, and if it is saved, the verification result is legality, otherwise, the result is illegality. F11: The system as claimed in any of F1-F10, wherein the system further comprises a cloud storage server and a push server, wherein the cloud storage server is configured to issue condition information and command information to the push server when there is a data update; the push server is configured to determine a target client according to the condition information, and send the command information to the target client via the socket server; and the target client is configured to enable data synchronization between it and the cloud storage server according to the command information, and the target client is a client among the plurality of browser clients.

Embodiments of the invention further disclose: G12: A method for preventing a malicious connection comprising: a browser client sending a connection request to a distributor to request establishing a connection with a socket server; the distributor receiving the connection request sent by the browser client, allocating a socket server to the browser client according to the connection request, and allocating a globally unique connection identifier to the connection, the distributor sending the connection information of the allocated socket server and the connection identifier to the browser client, and caching information related with the connection request and the connection identifier into a cache; the browser client establishing a connection with a corresponding socket server according to allocation by the distributor; and the socket server receiving the connection identifier from the browser client via the established connection with the browser client, verifying the received connection identifier according to the connection identifier cached in the cache, and keeping or disconnecting the connection according to the verification result. G13: The method as claimed in G12, wherein that the browser client establishes a connection with a corresponding socket server according to allocation by the distributor comprises: the browser client establishing a connection with the socket server according to the connection information and the connection identifier received from the distributor. G14: The method as claimed in G13, wherein the connection is a Transmission Control Protocol TCP connection, and the method further comprises the step of: if the result of verifying the connection identifier by the socket server is pass, then keeping the already established connection; and if the result is not pass, then disconnecting the connection. G15: The method as claimed in any of G12-G14, wherein the method further comprises the step of: the cache saving the information cached therein for a first predetermined period of time and then freeing it. G16: The method as claimed in G15, wherein the method further comprises the step of: if within a second predetermined period of time after the browser client establishes a connection with the socket server, the browser client does not send the connection identifier to the socket server, then the socket server disconnecting the established connection. G17: The method as claimed in G12, wherein that the distributor allocates a socket server to the browser client according to the connection request and allocates a globally unique connection identifier to the connection comprises: the distributor performing calculation using a preset algorithm based on user identification information contained in the connection request received from the browser client to obtain a connection identifier, and allocating a socket server to the browser client submitting the connection request according to the connection identifier. G18: The method as claimed in G12, wherein the method further comprises the step of: when the browser client establishes a connection with the socket server, the socket server obtaining a resource identifier identifying the connection relationship between the socket server and the browser client. G19: The method as claimed in G12, wherein the method further comprises the step of: after the verification of the connection identifier by the socket server is successful, it extracting information related with the connection request and the connection identifier from the cache, and storing the extracted information together with the obtained resource identifier in a database of the distributor. G20: The method as claimed in G19, wherein the user identification information comprises: the user name of a login user, and the machine hardware identification of a non-login user. G21: The method as claimed in G15, wherein the verification refers to verifying whether the connection identifier received by the socket server from the browser client which submits a request is saved in the cache, and if it is saved, the verification result is legality, otherwise, the result is illegality. G22: The method as claimed in any of G12-G21, wherein the method further comprises the steps of: the cloud storage server issuing condition information and command information to the push server when there is a data update; the push server determining a target client according to the condition information, and sending the command information to the target client via the socket server; and the target client enabling data synchronization between it and the cloud storage server according to the command information, wherein the target client is a client among the plurality of browser clients.

Embodiments of the invention further disclose: H23: A system for preventing a malicious connection in browser real-time synchronization comprising: a cloud storage server, a push server, a plurality of browser clients, a distributor and a socket server, wherein: the cloud storage server is configured to issue condition information and command information to the push server when there is a data update; the push server is configured to determine a target client among the plurality of browser clients according to the condition information, and send the command information to the target client via a socket server; and the target client is configured to enable data synchronization between it and the cloud storage server according to the command information; the distributor connects the plurality of browser clients and socket servers, and is configured to receive connection requests for being connected with socket servers sent by the plurality of browser clients, allocate socket servers to the browser clients according to the connection requests, and allocate globally unique connection identifiers to the connections, and the distributor sends the connection information of the allocated socket servers and the connection identifiers to the plurality of browser clients, and caches information related with the connection requests and the connection identifiers into a cache; and the socket server connects the distributor, the push server and the plurality of browser clients, and is configured to receive the connection identifiers from the plurality of browser clients and verify them, and keep or disconnect the connections with the plurality of browser clients according to the verification result, and to forward the command information from the push server to the target client.

Embodiments of the invention further disclose: I24: A distributor for distributing a plurality of socket servers comprising: a receiver configured to receive a connection request sent by a browser client; an allocator configured to allocate a socket server to the browser client according to the connection request, and allocate a globally unique connection identifier to the connection; a sender configured to send the connection information of the allocated socket server and the connection identifier to the browser client; a cache configured to cache information related with the connection request and the connection identifier; and a database configured to store information related with the connection request, the connection identifier, and a resource identifier identifying the connection relationship between the socket server and the browser client obtained by the socket server after the verification of the connection identifier is successful. I25: The distributor as claimed in I24, wherein the cache saves the information cached therein for a first predetermined period of time and then frees it.

Embodiments of the invention further disclose: J26: A method for distributing a plurality of socket servers comprising: receiving a connection request sent by a browser client; allocating a socket server to the browser client according to the connection request, and allocating a globally unique connection identifier to the connection; sending the connection information of the allocated socket server and the connection identifier to the browser client; caching information related with the connection request and the connection identifier in a cache; and storing in a database information related with the connection request, the connection identifier, and a resource identifier identifying the connection relationship between the socket server and the browser client obtained by the socket server after the verification of the connection identifier is successful. J27: The method as claimed in J26, wherein the cache saves the information cached therein for a first predetermined period of time and then frees it.

Embodiments of the invention further disclose: K1: A system for enabling browser data synchronization comprising: a cloud storage server, a push server and a plurality of browser clients, wherein the cloud storage server is configured to issue condition information and command information to the push server when there is a data update; the push server is configured to determine a target client among the plurality of browser clients according to the condition information, and send the command information to the target client; and the target client is configured to enable data synchronization between the target client and the cloud storage server according to the command information. K2: The system for enabling browser data synchronization as claimed in K1, wherein the system further has a plurality of socket servers between the push server and the plurality of browser clients; before the push server sends the command information to a target client among the plurality of browser clients according to the condition information, the plurality of browser clients establish socket connections with corresponding socket servers respectively; and when the push server sends the command information to a target client among the plurality of browser clients according to the condition information, the push server sends the command information to the target client among the plurality of browser clients via a corresponding socket server. K3: The system for enabling browser data synchronization as claimed in K2, wherein the system further comprises a distributor, and connections are established via the distributor between the plurality of browser clients and corresponding socket servers. K4: The system for enabling browser data synchronization as claimed in K3, wherein that a socket connection is established via the distributor between a browser client and a socket server comprises: the browser client submitting a connection request to the distributor, wherein in this connection request, there is at least comprised user identification information; the distributor performing calculation using a preset algorithm from the user identification information to obtain a globally unique connection identifier, and allocating a socket server to the browser client submitting the connection request according to the connection identifier; the distributor sending connection information of the socket server and the connection identifier to the browser client submitting the request; and the browser client submitting the request establishing a connection with the corresponding socket server according to the received connection information of the socket server and the connection identifier. K5: The system for enabling browser data synchronization as claimed in K4, wherein that the browser client submitting the request establishes a connection with the corresponding socket server according to the received connection information of the socket server comprises: the browser client submitting the request communicating the connection identifier received by it to the corresponding socket server; after receiving the connection identifier from the browser client submitting the request, the socket server verifying the connection identifier to the distributor, and after the verification is successful, keeping the connection established between the socket server and the browser client, and if the verification is unsuccessful, disconnecting the established connection; wherein when a connection between the socket server and the browser client is established, the socket server obtains a resource identifier identifying the connection relationship between the socket server and the browser client. K6: The system for enabling browser data synchronization as claimed in K5, wherein the user identification information comprises: the user name of a login user and the machine hardware identification of a non-login user. K7: The system for enabling browser data synchronization as claimed in K5, wherein the distributor comprises a distribution information database configured to store user identification information, connection identifiers and resource identifiers. K8: The system for enabling browser data synchronization as claimed in K7, wherein in the cloud storage server sending condition information and command information to the push server, the condition information comprises user identification information of a target client; that the push server sends the command information to a target client among the plurality of browser clients according to the condition information comprises: the push server adopting the same preset algorithm as the distributor to perform calculation for the user identification information of the target client to obtain a value, thereby obtaining a socket server allocated to the target client, and the push server sending the condition information and the command information to the socket server allocated to the target client; and the socket server querying the distribution information database in the distributor according to the user identification information in the condition information, determining the resource identifier corresponding to the target client, and sending the command information to the target client according to the resource identifier. K9: The system for enabling browser data synchronization as claimed in K5, wherein the distributor further comprises a distribution information database; the distributor further obtains user feature information from a browser client, and the user feature information comprises one of the following items: IP address information, browser version information and user classification information; and the distribution information database is configured to store the user feature information, connection identifiers and resource identifiers. K10: The system for enabling browser data synchronization as claimed in K9, wherein in the cloud storage server issuing the condition information and the command information to the push server, the condition information contains feature screening information for a target client, and that the push server sends the command information to a target client among the plurality of browser clients according to the condition information comprises: the push server pushing the condition information and the command information to all the socket servers; each socket server querying the distribution information database according to the feature screening information in the condition information, determining the resource identifier of a target client meeting the feature screening information, and sending the command information to the corresponding target client according to the resource identifier. K11: The system for enabling browser data synchronization as claimed in any of K7-K10, wherein the distribution information database is a document type database. K12: The system for enabling browser data synchronization as claimed in any of K7-K10, wherein the distribution information database takes the form of a database cluster. K13: The system for enabling browser data synchronization as claimed in K12, wherein the distribution information database is divided into a plurality of portions, and the individual portions of the database save information corresponding to respective socket servers. K14: The system for enabling browser data synchronization as claimed in K12, wherein the database cluster adopts a MongoDB cluster or a CouchDB cluster. K15: The system for enabling browser data synchronization as claimed in K13, wherein the socket server querying the distribution information database in the distributor according to the condition information comprises: the socket server querying in the distribution information database a portion corresponding to itself to determine a target client. K16: The system for enabling browser data synchronization as claimed in any of K1-K10, wherein the command information is a notification message or a content message.

Embodiments of the invention further disclose: L17: A method for enabling browser data synchronization, wherein the method comprises: a cloud storage server issuing condition information and command information to a push server when there is a data update; the push server determining a target client among a plurality of browser clients according to the condition information, and sending the command information to the target client; and the target client enabling data synchronization between the browser client and the cloud storage server according to the command information. L18: The method for enabling browser data synchronization as claimed in L17, wherein the method further comprises the steps of: before the push server sends the command information to a target client among the plurality of browser clients according to the condition information, the plurality of browser clients establishing connections with corresponding socket servers respectively; and when the push server sends the command information to a target client among the plurality of browser clients according to the condition information, the push server sending the command information to the target client among the plurality of browser clients via a corresponding socket server. L19: The method for enabling browser data synchronization as claimed in L18, wherein the method further comprises the step of: establishing connections via a distributor between the plurality of browser clients and corresponding socket servers. L20: The method for enabling browser data synchronization as claimed in L19, wherein the establishing a socket connection via a distributor between a browser client and a socket server further comprises the steps of: the browser client submitting a connection request to the distributor, wherein in this connection request, there is at least comprised user identification information; the distributor performing calculation using a preset algorithm from the user identification information to obtain a globally unique connection identifier, and allocating a socket server to the browser client submitting the connection request according to the connection identifier; the distributor sending connection information of the socket server and the connection identifier to the browser client submitting the request; and the browser client submitting the request establishing a connection with the corresponding socket server according to the received connection information of the socket server and the connection identifier. L21: The method for enabling browser data synchronization as claimed in L20, wherein the browser client submitting the request establishing a connection with the corresponding socket server according to the received connection information of the socket server further comprises the steps of: the browser client submitting the request communicating the connection identifier received by it to the corresponding socket server; after receiving the connection identifier from the browser client submitting the request, the socket server verifying the connection identifier to the distributor, and after the verification is successful, keeping the connection established between the socket server and the browser client, and if the verification is unsuccessful, disconnecting the established connection; wherein when a connection between the socket server and the browser client is established, the socket server obtains a resource identifier identifying the connection relationship between the socket server and the browser client. L22: The method for enabling browser data synchronization as claimed in L21, wherein the user identification information comprises: the user name of a login user and the machine hardware identification of a non-login user. L23: The method for enabling browser data synchronization as claimed in L22, wherein the method further comprises: storing the user identification information, connection identifiers and resource identifiers in a distribution information database of the distributor. L24: The method for enabling browser data synchronization as claimed in L23, wherein in the step of the cloud storage server sending condition information and command information to the push server, the condition information comprises user identification information of a target client; the step of the push server sending the command information to a target client among the plurality of browser clients according to the condition information comprises: the push server adopting the same preset algorithm as the distributor to perform calculation for the user identification information of the target client to obtain a value, thereby obtaining a socket server allocated to the target client; the push server sending the condition information and the command information to the socket server allocated to the target client; and the socket server querying the distribution information database according to the user identification information in the condition information, determining the resource identifier corresponding to the target client, and sending the command information to the target client according to the resource identifier. L25: The method for enabling browser data synchronization as claimed in L21, wherein the method further comprises: the distributor further obtaining user feature information from a browser client, wherein the user feature information comprises one of the following items: IP address information, browser version information and user classification information; and storing the user feature information, connection identifiers and resource identifiers in the distribution information database comprised in the distributor. L26: The method for enabling browser data synchronization as claimed in L25, wherein in the cloud storage server issuing the condition information and the command information to the push server, the condition information contains feature screening information for a target client; and the step of the push server sending the command information to a target client among the plurality of browser clients according to the condition information comprises: the push server pushing the condition information and the command information to all the socket servers; each socket server querying the distribution information database according to the feature screening information in the condition information, determining the resource identifier of a target client meeting the feature screening information, and sending the command information to the determined target client according to the resource identifier. L27: The method for enabling browser data synchronization as claimed in any of L23-L26, wherein the distribution information database is a document type database. L28: The method for enabling browser data synchronization as claimed in any of L23-L26, wherein the distribution information database takes the form of a database cluster. L29: The method for enabling browser data synchronization as claimed in L28, wherein the distribution information database is divided into a plurality of portions, and the individual portions of the database save information corresponding to respective socket servers. L30: The method for enabling browser data synchronization as claimed in L28, wherein the database cluster adopts a MongoDB cluster or a CouchDB cluster. L31: The method for enabling browser data synchronization as claimed in L29, wherein the socket server querying the distribution information database in the distributor according to the condition information comprises: the socket server querying in the distribution information database a portion corresponding to itself to determine a target client. L32: The method for enabling browser data synchronization as claimed in L19, wherein the command information is a notification message or a content message.

Embodiments of the invention further disclose: M33: A distribution information database, wherein the distribution information database is in the form of a cluster database comprising N information units, wherein each information unit corresponds to a socket server, in each information unit is stored information related to a connection corresponding to the socket server, and N is the number of socket servers connected to the distribution information database. M34: The distribution information database as claimed in M33, wherein each information unit maintains an information list taking a connection identifier as a key, and the list comprises at least one of the following items: user identification information, user feature information, and resource identifiers, wherein the connection identifier is a globally unique identifier for identifying a connection between a socket server and a browser client, and a resource identifier is an identifier identifying a connection between a socket server and a browser client within the socket server. M35: The distribution information database as claimed in M33, wherein the database cluster adopts a MongoDB cluster or a CouchDB cluster. M36: The distribution information database as claimed in any of M33-35, wherein the distribution information database is a document type database.

Embodiments of the invention further disclose: N1: A socket server for sending command information from a push server to a target client among a plurality of browser clients, the socket server comprising a connection module, and the connection module being configured to establish a socket connection with the browser client, wherein when the browser client initiates a connection with the socket server, the connection module accepts the connection, and obtains a resource identifier of the connection. N2: The socket server as claimed in N1, wherein the connection module is further configured to receive via the connection a connection identifier sent by the browser client; and the socket server further comprises a verification module configured to, when receiving a connection identifier sent by the browser client, query a distribution information database to verify whether the connection identifier is present in the distribution information database. N3: The socket server as claimed in N2, wherein the verification module is further configured to store the resource identifier in the distribution information database when the connection identifier is present in the distribution information database. N4: The socket server as claimed in N2, wherein the verification module is further configured to instruct the connection module to disconnect the connection when the connection identifier is not present in the distribution information database. N5: The socket server as claimed in N2, wherein it further comprises a query module, and when the push server sends the condition information and the command information to a socket server allocated to a target client, the query module queries the distribution information database according to the condition information to determine the target client. N6: The socket server as claimed in N5, wherein the connection module queries in the distribution information database the resource identifier according to the condition information to determine the target client. N7: The socket server as claimed in N1, wherein when the socket server has received the command information and determined the target client according to the condition information, and there are more than one target clients, after sending a command message to one of the clients, the connection module will not wait for its reception and confirmation and directly send the command message to the next client. N8: The socket server as claimed in N1, wherein the connection module adopts the Transmission Control Protocol to connect with the browser client and send command information.

Embodiments of the invention further disclose: O9: A socket service method applied in a socket server, the socket server being configured to establish a socket connection with a browser client and send command information from a push server to a target client among a plurality of browser clients, wherein the method comprises: when the browser client initiates a connection with the socket server, accepting the connection, and obtaining a resource identifier of the connection. O10: The socket service method as claimed in O9, wherein the method further comprises: receiving via the connection a connection identifier sent from the browser client, and querying a distribution information database to verify whether the connection identifier is present in the distribution information database. O11: The socket service method as claimed in O10, wherein the method further comprises: storing the resource identifier in the distribution information database when the connection identifier is present in the distribution information database. O12: The socket service method as claimed in O10, wherein the method further comprises: disconnecting the connection when the connection identifier is not present in the distribution information database. O13: The socket service method as claimed in O10, wherein the method further comprises: when the push server sends the condition information and the command information to a socket server allocated to a target client, querying the distribution information database according to the condition information to determine the target client. O14: The socket service method as claimed in O13, wherein the querying the distribution information database according to the condition information to determine the target client comprises: querying in the distribution information database the resource identifier according to the condition information to determine the target client. O15: The socket service method as claimed in O9, wherein the method further comprises: when having received the command information and determined the target client according to the condition information, and there are more than one target clients, after sending a command message to one of the clients, not waiting for its reception and confirmation and directly sending the command message to the next client. O16: The socket service method as claimed in O9, wherein the Transmission Control Protocol is adopted to connect with the browser client and send command information.

Embodiments of the invention further disclose: P17: A system for enabling browser data synchronization comprising: a cloud storage server, a push server, a plurality of browser clients and a socket server, wherein the cloud storage server is configured to issue condition information and command information to the push server when there is a data update; the push server is configured to determine a target client among the plurality of browser clients according to the condition information, and send the command information to a socket server connected with the target client; and the target client is configured to enable data synchronization between it and the cloud storage server according to the command information; and the socket server is configured to send command information from the push server to a corresponding target client. 18: The system for enabling browser data synchronization as claimed in claim 7, wherein the system further comprises: a distributor configured to allocate a socket server connected with it to a browser client; and the distributor further comprises a distribution information database configured to store information related to the allocation of a socket server.

The invention claimed is:

1. A system for enabling real-time data synchronization, comprising:
   a cloud storage server computing device configured to issue condition information and command information to a push server computing device when there is a data update;
   the push server computing device configured to determine a first client computing device among a plurality of client computing devices according to the condition information, and send the command information to the first client computing device via a corresponding socket server;
   the first client computing device configured to enable data synchronization between it and the cloud storage server computing device according to the command information;
   wherein the system further comprises a distributor and a plurality of socket servers, the distributor is configured to allocate each socket server among the plurality of socket servers to different client computing devices among the plurality of client computing devices, allocate the corresponding socket server among the plurality of socket servers to the first client computing device, establish a connection between the corresponding socket server and the first client computing device and enable the real-time data synchronization; and wherein allocating the corresponding socket to the first client computing device and establishing the connection between the corresponding socket server and the first client computing device further comprises:
receiving, by the distributor, a request for connecting to the corresponding socket server from the first client computing device, the connection request comprising at least user identification information,
calculating, by the distributor, a connection identifier using a preset algorithm based at least on the user identification information,
allocating the corresponding socket server to the first client computing device based on the connection identifier, and
sending, over a network, by the distributor, the connection identifier and connection information of the corresponding socket server to the first client computing device, the connection information of the corresponding socket server comprising at least an Internet Protocol (IP) address and a port number of the corresponding socket server.

2. The system of claim 1, wherein;
before the push server computing device sends the command information to a first client computing device among the plurality of client computing devices according to the condition information, the plurality of client computing devices establish socket connections with corresponding socket servers respectively; and
when the push server computing device sends the command information to a first client computing device among the plurality of client computing devices according to the condition information, the push server computing device sends the command information to the first client computing device among the plurality of client computing devices via a corresponding socket server.

3. The system of claim 1, wherein the establishing the connection between the corresponding socket server and the first client computing device further comprises:
the first client computing device submitting the request sending the received connection identifier to the corresponding socket server;
after receiving the connection identifier from the first client computing device submitting the request, the corresponding socket server verifying the connection identifier to the distributor, and after the verification is successful, keeping the connection established between the corresponding socket server and the first client computing device, and if the verification is unsuccessful, disconnecting the established connection;
wherein when a connection between the socket server and the first client computing device is established, the corresponding socket server obtains a resource identifier identifying the connection relationship between the corresponding socket server and the first client computing device.

4. The system of claim 3, wherein the user identification information comprises: a user name of a login user or a machine hardware identification of a non-login user.

5. The system of claim 3, wherein the distributor comprises a distribution information database configured to store user identification information, connection identifiers and resource identifiers.

6. The system of claim 5, wherein the condition information comprises user identification information of a first client computing device; and wherein
the push server computing device sending the command information to a first client computing device among the plurality of client computing devices according to the condition information comprises:
the push server computing device adopting the same preset algorithm as the distributor to perform calculation for the user identification information of the first client computing device to obtain a connection identifier, thereby obtaining the corresponding socket server allocated to the first client computing device;
the push server computing device sending the condition information and the command information to the socket server allocated to the first client computing device; and
the corresponding socket server querying the distribution information database in the distributor according to the user identification information in the condition information, determining the resource identifier corresponding to the first client computing device, and sending the command information to the first client computing device according to the resource identifier.

7. The system of claim 3, wherein the distributor further comprises a distribution information database;
the distributor further obtains user feature information from the first client computing device, and the user feature information comprises one of the following items: IP address information, browser version information and user classification information; and
the distribution information database is configured to store the user feature information, connection identifiers and resource identifiers.

8. The system of claim 7, wherein in the cloud storage server issuing the condition information and the command information to the push server computing device, the condition information contains feature screening information for the first client computing device, and wherein
the push server computing device sending the command information to the first client computing device among the plurality of client computing devices according to the condition information comprises:
the push server computing device pushing the condition information and the command information to all of the plurality of socket servers;
each socket server querying the distribution information database according to the feature screening information in the condition information, determining the resource identifier of the first client computing device meeting the feature screening information, and sending the command information to the first client computing device according to the resource identifier.

9. A method for enabling real-time data synchronization, wherein the method comprises:
issuing condition information and command information, by a cloud storage server computing device, to a push server computing device when there is a data update in the cloud storage server computing device;

determining a first client computing device among a plurality of client computing devices according to the condition information by the push server computing device;
sending, by the push server computing device, the command information to the first client computing device via a corresponding socket server;
performing data synchronization between the first client computing device and the cloud storage server computing device according to the command information; and
allocating, by a distributor, each socket server among a plurality of socket servers to different client computing devices among the plurality of client computing devices, allocating the corresponding socket server among a plurality of socket servers to the first client computing device and establishing a connection between the corresponding socket server and the first client computing device to enable the real-time data synchronization, wherein the allocating the corresponding socket to the first client computing device and establishing the connection between the corresponding socket server and the first client computing device further comprises:
  receiving, by the distributor, a request for connecting to the corresponding socket server from the first client computing device, the connection request comprising at least user identification information,
  calculating, by the distributor, a connection identifier using a preset algorithm based at least on the user identification information,
  allocating the corresponding socket server to the first client computing device based on the connection identifier, and
  sending, over a network, by the distributor, the connection identifier and connection information of the corresponding socket server to the first client computing device, the connection information of the corresponding socket server comprising at least an Internet Protocol (IP) address and a port number of the corresponding socket server.

10. The method of claim 9, further comprising:
before the sending, by the push server computing device, the command information to the first client computing device via a corresponding socket server the plurality of browser clients establishing socket connections with corresponding socket servers respectively.

11. The method of claim 9, wherein the establishing the connection between the corresponding socket server and the first client computing device further comprises:
  the first client computing device submitting the request sending the received connection identifier to the corresponding socket server;
  after receiving the connection identifier from the first client computing device submitting the request, the corresponding socket server verifying the connection identifier to the distributor, and after the verification is successful, keeping the connection established between the corresponding socket server and the first client computing device, and if the verification is unsuccessful, disconnecting the established connection;
  wherein when a connection between the socket server and the first client computing device is established, the corresponding socket server obtains a resource identifier identifying the connection relationship between the corresponding socket server and the first client computing device.

12. The method of claim 11, further comprising:
storing the user identification information, connection identifiers and resource identifiers in a distribution information database of the distributor.

13. The method of claim 12, wherein
the condition information comprises user identification information of a target client; and wherein
the sending, by the push server computing device, the command information to the first client computing device via a corresponding socket server further comprises:
  the push server computing device adopting the same preset algorithm as the distributor to perform calculation for the user identification information of the first client computing device to obtain a connection identifier, thereby obtaining the corresponding socket server allocated to the first client computing device;
  the push server computing device sending the condition information and the command information to the socket server allocated to the first client computing device; and
  the corresponding socket server querying the distribution information database according to the user identification information in the condition information, determining the resource identifier corresponding to the first client computing device, and sending the command information to the first client computing device according to the resource identifier.

14. The method of claim 13, further comprising:
the distributor further obtaining user feature information from the first client, wherein the user feature information comprises one of the following items: IP address information, browser version information and user classification information; and
storing the user feature information, connection identifiers and resource identifiers in the distribution information database comprised in the distributor.

15. The method of claim 14, wherein
the condition information contains feature screening information for the first client computing device; and wherein
the sending, by the push server computing device, the command information to the first client computing device via a corresponding socket server further comprises:
  the push server computing device pushing the condition information and the command information to all of the plurality of socket servers;
  each socket server querying the distribution information database according to the feature screening information in the condition information, determining the resource identifier of the first client computing device meeting the feature screening information, and sending the command information to the first client computing device according to the resource identifier.

16. A non-transitory computer readable medium having instructions stored thereon that, when executed by at least one processor, cause the at least one processor to perform operations for enabling real-time data synchronization, the operations comprising:
  issuing condition information and command information, by a cloud storage server computing device, to a push server computing device when there is a data update in the cloud storage server computing device;

determining a first client computing device among a plurality of client computing devices according to the condition information by the push server computing device;
sending, by the push server computing device, the command information to the first client computing device via a corresponding socket server;
performing data synchronization between the first client computing device and the cloud storage server computing device according to the command information; and
allocating, by a distributor, each socket server among a plurality of socket servers to different client computing devices among the plurality of client computing devices, allocating the corresponding socket server among a plurality of socket servers to the first client computing device and establishing a connection between the corresponding socket server and the first client computing device to enable the real-time data synchronization, wherein the allocating the corresponding socket to the first client computing device and establishing the connection between the corresponding socket server and the first client computing device further comprises:
receiving, by the distributor, a request for connecting to the corresponding socket server from the first client computing device, the connection request comprising at least user identification information,
calculating, by the distributor, a connection identifier using a preset algorithm based at least on the user identification information,
allocating the corresponding socket server to the first client computing device based on the connection identifier, and
sending, over a network, by the distributor, the connection identifier and connection information of the corresponding socket server to the first client computing device, the connection information of the corresponding socket server comprising at least an Internet Protocol (IP) address and a port number of the corresponding socket server.

* * * * *